(12) United States Patent
Koh et al.

(10) Patent No.: US 9,584,741 B2
(45) Date of Patent: Feb. 28, 2017

(54) IMAGE SENSOR HAVING MULTIPLE OPERATION MODES

(71) Applicants: Kyoung-Min Koh, Hwaseong-si (KR); Ju-Hyun Ko, Hwaseong-si (KR); Han Yang, Seoul (KR); Jae-Cheol Yun, Seoul (KR); Kwang-Hyun Lee, Seongnam-si (KR); Seon-Ju Lee, Seoul (KR)

(72) Inventors: Kyoung-Min Koh, Hwaseong-si (KR); Ju-Hyun Ko, Hwaseong-si (KR); Han Yang, Seoul (KR); Jae-Cheol Yun, Seoul (KR); Kwang-Hyun Lee, Seongnam-si (KR); Seon-Ju Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 31 days.

(21) Appl. No.: 14/513,575

(22) Filed: Oct. 14, 2014

(65) Prior Publication Data

US 2015/0195463 A1   Jul. 9, 2015

(30) Foreign Application Priority Data

Jan. 8, 2014   (KR) .................. 10-2014-0002421

(51) Int. Cl.
*H04N 3/14* (2006.01)
*H04N 5/335* (2011.01)
(Continued)

(52) U.S. Cl.
CPC ......... *H04N 5/347* (2013.01); *H04N 5/23212* (2013.01); *H04N 5/35554* (2013.01);
(Continued)

(58) Field of Classification Search
CPC .... H04N 5/35563; H04N 5/376; H04N 5/374; H04N 5/3535; H04N 5/3537; H04N 3/1556; H04N 3/1506; H04N 3/1575; H04N 5/3741; H04N 3/1512; H04N 5/3745; H01L 27/14643
(Continued)

(56) References Cited

U.S. PATENT DOCUMENTS

| 4,185,191 A | 1/1980 | Stauffer |
| 6,906,751 B1 | 6/2005 | Norita et al. |

(Continued)

FOREIGN PATENT DOCUMENTS

| JP | 2010020055 A | 1/2010 |
| JP | 2010054968 A | 3/2010 |

*Primary Examiner* — Chia-Wei A Chen
(74) *Attorney, Agent, or Firm* — Harness, Dickey & Pierce, P.L.C.

(57) ABSTRACT

An image sensor includes a pixel array in which a plurality of pixels, first and second row selection lines separated from each other, and first and second column lines separated from each other are disposed and a column selecting circuit configured to connect the first and second column lines using a column selection signal. The pixel array includes a first pixel which is connected to the first row selection line and the first column line and a second pixel which is disposed in the same row as the first pixel and connected to the second row selection line and the second column line.

19 Claims, 24 Drawing Sheets

(51) Int. Cl.
  *H04N 9/04*    (2006.01)
  *H04N 9/083*   (2006.01)
  *H04N 5/235*   (2006.01)
  *H04N 5/347*   (2011.01)
  *H04N 5/378*   (2011.01)
  *H04N 5/232*   (2006.01)
  *H04N 5/355*   (2011.01)
  *H04N 5/369*   (2011.01)
  *H04N 5/3745*  (2011.01)

(52) U.S. Cl.
  CPC .......... *H04N 5/3696* (2013.01); *H04N 5/378* (2013.01); *H04N 5/37457* (2013.01); *H04N 9/045* (2013.01); *H04N 2209/045* (2013.01)

(58) Field of Classification Search
  USPC ........ 348/218.1, 222.1–231.1, 302–310, 281
  See application file for complete search history.

(56) References Cited

U.S. PATENT DOCUMENTS

| | | | |
|---|---|---|---|
| 7,750,278 B2 | 7/2010 | Oike et al. | |
| 7,777,804 B2 | 8/2010 | Shan et al. | |
| 7,825,969 B2 | 11/2010 | Tico et al. | |
| 8,013,919 B2 | 9/2011 | Yaffe et al. | |
| 8,264,595 B2 | 9/2012 | Sano et al. | |
| 8,274,588 B2 | 9/2012 | Mabuchi | |
| 8,373,784 B2 | 2/2013 | Sugiyama | |
| 2004/0080648 A1* | 4/2004 | Rhodes | H01L 27/14603 348/308 |
| 2008/0174685 A1* | 7/2008 | Shan | H01L 27/14654 348/308 |
| 2009/0316026 A1* | 12/2009 | Okumura | H04N 5/3741 348/281 |
| 2010/0012993 A1* | 1/2010 | Yamashita | H04N 5/37457 257/292 |
| 2010/0053346 A1* | 3/2010 | Mitsunaga | H04N 5/23248 348/208.6 |
| 2011/0063483 A1 | 3/2011 | Rossi et al. | |
| 2011/0080493 A1* | 4/2011 | Kono | H01L 27/14609 348/222.1 |
| 2012/0218426 A1* | 8/2012 | Kaizu | H04N 5/35554 348/208.4 |
| 2013/0033631 A1* | 2/2013 | Mabuchi | H04N 5/37452 348/302 |
| 2013/0141621 A1* | 6/2013 | Ishii | H04N 5/361 348/308 |
| 2013/0182090 A1* | 7/2013 | Hagihara | H04N 5/335 348/65 |
| 2013/0242152 A1* | 9/2013 | Kasai | H04N 5/2353 348/294 |
| 2013/0308044 A1* | 11/2013 | Mitsunaga | H04N 5/3532 348/362 |
| 2013/0329128 A1* | 12/2013 | Kaizu | H04N 5/374 348/367 |
| 2014/0118572 A1* | 5/2014 | Kuang | H04N 9/045 348/222.1 |
| 2014/0267914 A1* | 9/2014 | Sfaradi | H04N 5/91 348/571 |
| 2014/0368713 A1* | 12/2014 | Matsuda | H04N 5/351 348/308 |
| 2015/0002717 A1* | 1/2015 | Kudoh | H01L 27/14603 348/308 |
| 2015/0009383 A1* | 1/2015 | Fujii | H04N 5/347 348/302 |
| 2015/0062368 A1* | 3/2015 | Li | G06T 5/50 348/222.1 |
| 2015/0070554 A1* | 3/2015 | Shimizu | H04N 5/374 348/308 |
| 2015/0163422 A1* | 6/2015 | Fan | H04N 5/3535 348/295 |
| 2015/0163430 A1* | 6/2015 | Kanemitsu | H04N 5/378 348/308 |
| 2015/0189210 A1* | 7/2015 | Shimizu | H04N 5/378 348/301 |

* cited by examiner

FIG. 7

| B (P1~P3, P8~P10, P15~P17) | Gb (P2~P4, P9~P11, P16~P18) | b (P5~P7, P12~P14, P19~P21) | ... |
|---|---|---|---|
| Gr (P8~P10, P15~P17, P22~P24) | R (P9~P11, P16~P18, P23~P25) | Gr (P12~P14, P19~P21, P26~P28) | ... |
| ⋮ | ⋮ | | |

FIG. 20

| B (P201~P203, P208~P210, P215~P217) | Gb (P202~P204, P209~P211, P216~P218) | AF1 (P205~P207, P212~P214, P219~P221) |
|---|---|---|
| Gr (P208~P210, P215~P217, P222~P224) | R (P209~P211, P216~P218, P223~P225) | AF2 (P212~P214, P219~P221, P226~P228) |

IMAGE SENSOR HAVING MULTIPLE OPERATION MODES

CROSS REFERENCE TO RELATED APPLICATIONS

This application claims priority from Korean Patent Application No. 10-2014-0002421 filed on Jan. 8, 2014 in the Korean Intellectual Property Office, the disclosure of which is incorporated herein by reference in its entirety.

BACKGROUND

1. Field

At least some example embodiments relate to an image sensor.

2. Description of the Related Art

An image sensor is one of the semiconductor devices that convert optical information into an electrical signal. Examples of the image sensor include a charge coupled device (CCD) image sensor and a complementary metal-oxide semiconductor (CMOS) image sensor.

Research is being conducted on an image sensor that performs both a full mode operation and a binning mode operation.

The full mode operation is an operation of sensing an image using information of all pixels included in a pixel array. On the other hand, the binning mode operation is an operation of collecting information of selected pixels and sensing an image using the collected information.

SUMMARY

At least some example embodiments provide an image sensor which can reliably perform wide dynamic range (WDR) and auto focusing even in a binning mode operation.

However, example embodiments are not restricted to the one set forth herein.

According to an example embodiment, there is provided an image sensor including a pixel array including a plurality of pixels including at least a first pixel and a second pixel, first and second row selection lines separated from each other, and first and second column lines separated from each other, and a column selecting circuit configured to connect the first and second column lines using a column selection signal, the first pixel connected to the first row selection line and the first column line, and the second pixel being in the same row as the first pixel and connected to the second row selection line and the second column line.

According to another example embodiment, there is provided an image sensor including a pixel array including a plurality of pixels, first and second row selection lines separated from each other, and column lines intersecting the first and second row selection lines, a row scanning circuit configured to control the first and second row selection lines, and a sampling circuit configured to receive outputs of the column lines and convert the received outputs into digital signals, the first and second row selection lines being in each row of the pixel array, and at least one select transistor in a number of the plurality of pixels is connected to one of the first and second row selection lines.

According to an example embodiment, there is provided an image sensor including a pixel array including a plurality of pixels having at least a first pixel, a second pixel and a third pixel, first and second row selection lines separated from each other, and first and second column lines separated from each other are disposed, the first pixel of the plurality of pixels is connected to the first row selection line and the first column line, the second pixel of the plurality of pixels is connected to the first column line and the second row selection line, and the third pixel of the plurality of pixels is in the same row of the pixel array as the second pixel and connected to the first row selection line and the second column line.

According to an example embodiment, there is provided an image sensor including a pixel array including a plurality of pixels in columns and first and second column selection lines are disposed in each column of the pixels, a column selecting circuit configured to select at least one of the first and second column selection lines in each column of the pixels, and a sampling circuit configured to receive an output of the selected column selection line and converts the received output into a digital signal.

At least one example embodiment discloses an image sensor including a pixel array having rows and columns of pixels, the rows connected to first and second selection lines and the pixel array having first exposure pixels and second exposure pixels, a control circuit configured to supply at least one control signal to the pixels such that an exposure time of the first exposure pixels is greater than an exposure time of the second exposure pixels, and a column selecting circuit configured to connect a number of the columns of pixels based on an operating mode of the image sensor.

BRIEF DESCRIPTION OF THE DRAWINGS

The above and other aspects and features of example embodiments will become more apparent by describing in detail embodiments thereof with reference to the attached drawings, in which:

FIG. 7 is a diagram illustrating pixel arrangement in a case where the image sensor of FIG. 1 performs the binning mode operation;

FIG. 20 is a diagram illustrating pixel arrangement in a case where the image sensor of FIG. 12 performs the binning mode operation;

DETAILED DESCRIPTION OF EXAMPLE EMBODIMENTS

Figure 1:
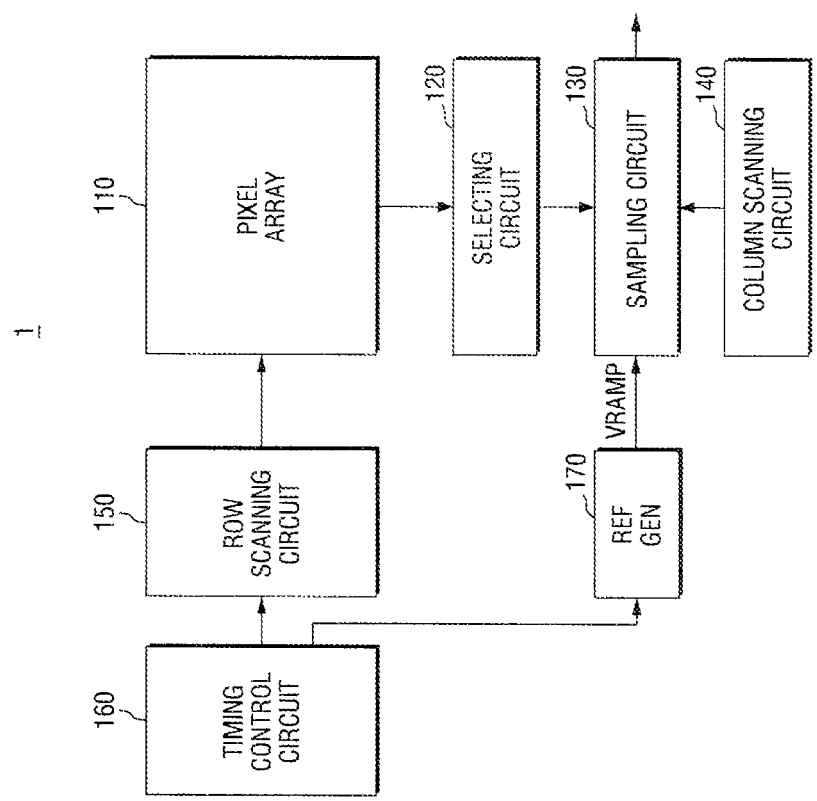
FIG. 1 is a block diagram of an image sensor according to an example embodiment.

Advantages and features of example embodiments and methods of accomplishing the same may be understood more readily by reference to the following detailed description of example embodiments and the accompanying drawings. Example embodiments may, however, be embodied in many different forms and should not be construed as being limited to the embodiments set forth herein. Rather, these embodiments are provided so that this disclosure will be thorough and complete and will fully convey the concept of example embodiments to those skilled in the art, and example embodiments will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing example embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of example embodiments.

Unless defined otherwise, all technical and scientific terms used herein have the same meaning as commonly understood by one of ordinary skill in the art to which example embodiments belong. It is noted that the use of any and all examples, or exemplary terms provided herein is intended merely to better illuminate example embodiments and is not a limitation on the scope of example embodiments unless otherwise specified. Further, unless defined otherwise, all terms defined in generally used dictionaries may not be overly interpreted.

An image sensor according to an example embodiment will now be described with reference to FIGS. 1 through 4.

Figure 2:
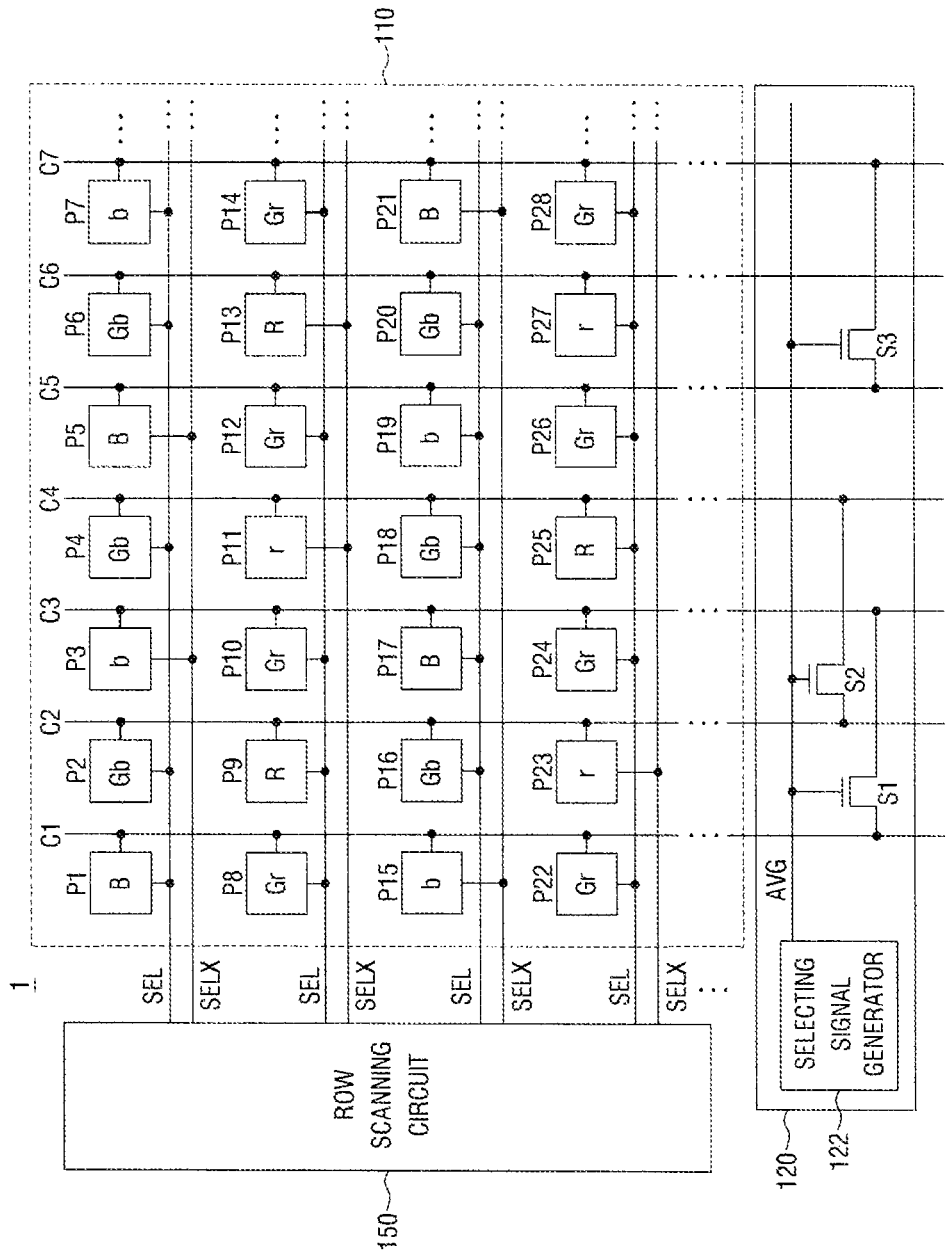
FIG. 2 is a circuit diagram of a pixel array and a column selecting circuit of FIG. 1.
Figure 3A:
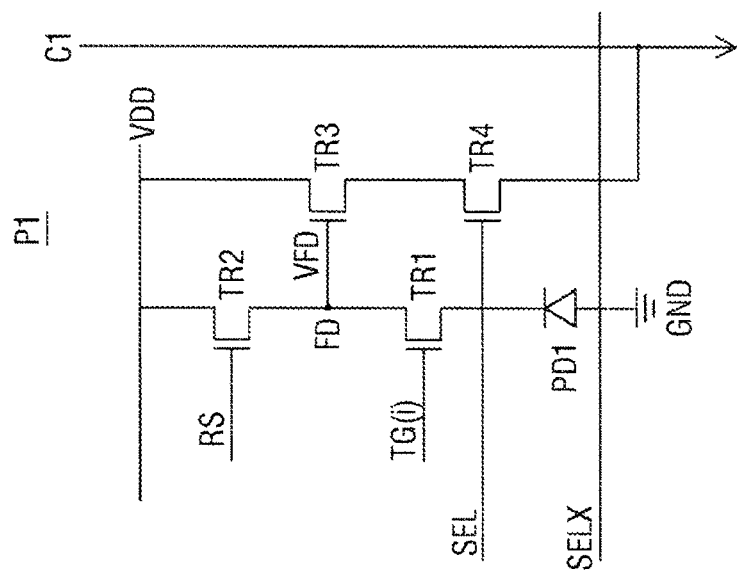
FIGS. 3A and 3B are circuit diagrams of pixels included in the pixel array of FIG. 2.
Figure 3B:
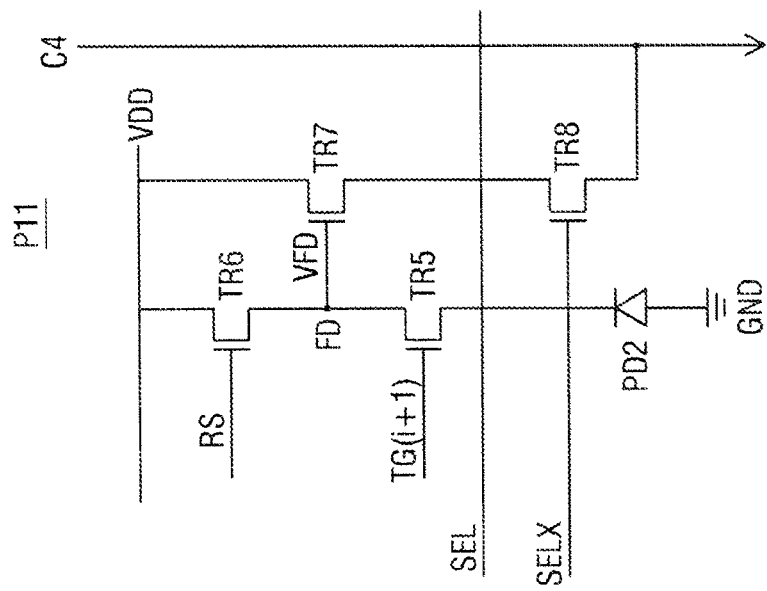
Figure 4:
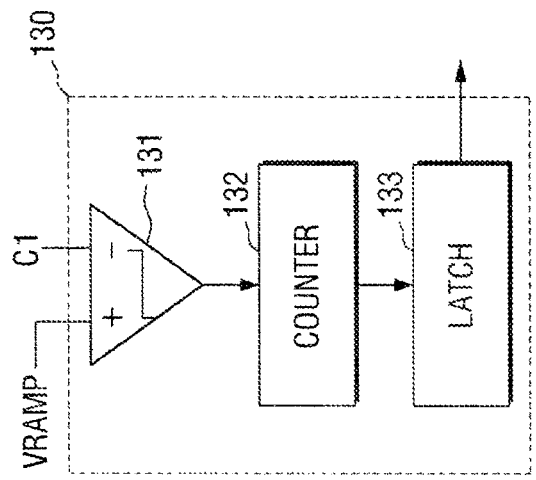
FIG. 4 is a detailed block diagram of a sampling circuit of FIG. 1.

FIG. 1 is a block diagram of an image sensor 1 according to an example embodiment. FIG. 2 is a circuit diagram of a pixel array 110 and a column selecting circuit 120 of FIG. 1. FIGS. 3A and 3B are circuit diagrams of pixels included in the pixel array 110 of FIG. 2. FIG. 4 is a detailed block diagram of a sampling circuit 130 of FIG. 1.

Referring to FIG. 1, the image sensor 1 includes the pixel array 110, the column selecting circuit 120, a timing control circuit 160, a row scanning circuit 150, a column scanning circuit 140, a reference signal generator 170, and the sampling circuit 130.

The pixel array 110 may include a plurality of pixels. The pixels may be arranged in a matrix pattern. Each of the pixels may have a 3-transistor structure, a 4-transistor structure, a 5-transistor structure, a 6-transistor structure, or the like according to the number of transistors included in a signal generating circuit.

Referring to FIG. 2, first and second row selection lines SEL and SELX separated from each other may be provided in each row of the pixel array 110. A plurality of column lines C1 through C7 separated from each other may be provided in a plurality of columns, respectively. In an example, if the pixel array 110 includes (M×N) pixels (where M and N are integers of two or more), M first row selection lines SEL, M second row selection lines SELX, and N column lines C1 through C7 may be provided in the pixel array 110.

Row addressing and row scanning of the pixel array 110 may be controlled by the row scanning circuit 150 through the first and second row selection lines SEL and SELX, and column addressing and column scanning of the pixel array 110 may be controlled by the column scanning circuit 140 through the column lines C1 through C7.

If the image sensor 1 employs Bayer pattern technology, the pixels within the active pixel array 110 may be arranged to receive red light, green light and blue light, respectively.

In FIG. 1, the pixels within the pixel array 110 may be used for wide dynamic range (WDR). In the WDR, pixels that receive the red light and the blue light may be used to determine the color of a sensed image, and pixels that receive the green light may be used to determine the brightness of the sensed image. Therefore, the pixels that receive the red light and the blue light may respectively include long exposure pixels R and B and short exposure pixels r and b, and the pixels that receive the green light may include first-type pixels Gr and second-type pixels Gb.

In addition, the pixels within the pixel array 110 may be arranged in a chess mosaic pattern. Accordingly, the long exposure pixels R and B and the short exposure pixels r and b may be arranged alternately with the first-type pixels Gr and the second-type pixels Gb interposed therebetween. Specifically, a second pixel P2, a fourth pixel P4, a sixth pixel P6, a sixteenth pixel P16, an eighteenth pixel P18 and a twentieth pixel P20 which are the second-type pixels Gb may respectively be disposed between a first pixel P1, a fifth pixel P5, a seventeenth pixel P17 and twenty first pixel P21 which are the long exposure pixels B receiving the blue light and a third pixel P3, a seventh pixel P7, a fifteenth pixel P15 and a nineteenth pixel P19 which are the short exposure pixels b receiving the blue light. In addition, an eighth pixel P8, a tenth pixel P10, a twelfth pixel P12, a fourteenth pixel P14, a twenty second pixel P22, a twenty fourth pixel P24, a twenty sixth pixel P26 and a twenty eighth pixel P28 which are the first-type pixels Gr may respectively be disposed between a ninth pixel P9, a thirteenth pixel P13 and a twenty fifth pixel P25 which are the long exposure pixels R receiving the red light and an eleventh pixel P11, a twenty third pixel P23 and a twenty seventh pixel P27 which are the short exposure pixels r receiving the red light.

However, example embodiments are not limited to the above arrangement, and the arrangement of the pixels P1 through P28 within the pixel array 110 can be changed as desired. For example, in some other example embodiments, the pixels P1 through P28 within the pixel array 110 may be configured to receive magenta (Mg) light, yellow (Y) light, cyan (Cy) light, and/or white (W) light, respectively.

In FIG. 1, pixels disposed in the same row may be connected to different row selection lines SEL and SELX.

Specifically, pixels P1, P2, P4, P6 and P7 of the first through seventh pixels P1 through P7 disposed in an $i^{th}$ row (where i is a natural number) may be connected to the first row selection line SEL, and the other pixels P3 and P5 may be connected to the second row selection line SELX. Pixels P8, P9, P10, P12 and P14 of the eighth through fourteenth pixels P8 through P14 disposed in an $(i+1)^{th}$ row may be connected to the first row selection line SEL, and the other pixels P11 and P13 may be connected to the second row selection line SELX. Pixels P16, P17, P18, P19 and P20 of the fifteenth through twenty first pixels P15 through P21 disposed in an $(i+2)^{th}$ row may be connected to the first row selection line SEL, and the other pixels P15 and P21 may be connected to the second row selection line SELX. Pixels P22, P24, P25, P26, P27 and P28 of the twenty second through twenty eighth pixels P22 through P28 disposed in an $(i+3)^{th}$ row may be connected to the first row selection line SEL, and the other pixel P23 may be connected to the second row selection line SELX.

The pixels P1 through P28 included in the pixel array 110 are arranged as described above to enable the image sensor 1 to perform WDR even when operating in a binning mode. This will be described in greater detail later.

The pixels P1 through P28 included in the pixel array 110 may be divided into pixels connected to the first row selection line SEL and pixels connected to the second row selection line SELX as described above.

Referring to FIG. 3A, a pixel (e.g., the first pixel P1) connected to the first row selection line SEL may include a photodiode PD1, a transfer transistor TR1, a reset transistor TR2, a drive transistor TR3, and a select transistor TR4. A pixel having a 4-transistor structure will hereinafter be described as an example, but example embodiments are not limited to this example. The pixel structure can also be changed to a 3-transistor structure, a 5-transistor structure, a 6-transistor structure, etc., as described above The photodiode PD1 is a light-receiving device that receives an external optical image. The photodiode PD1 may generate photocharges in proportion to incident light. In FIG. 3A, the photodiode PD1 is illustrated as an example of the light-receiving device. However, example embodiments are not limited thereto, and the form of the light-receiving device can be changed as desired.

The photodiode PD1 may be connected between the transfer transistor TR1 and a ground terminal GND.

The transfer transistor TR1 may transfer photocharges generated by the photodiode PD1 to a gate terminal of the drive transistor TR3 via a floating diffusion node FD. To this end, the transfer transistor TR1 may have a drain terminal connected to the floating diffusion node FD, a source terminal connected to the photodiode PD1, and a gate terminal connected to the row scanning circuit 150 (see FIG. 2). When receiving a transfer control signal TG(i) (since the first pixel P1 is disposed in the $i^{th}$ row, the transfer control signal TG(i) for the $i^{th}$ row is provided to the first pixel P1) from the row scanning circuit 150 (see FIG. 2), the transfer transistor TR1 may be turned on to provide an output of the photodiode PD1 to the floating diffusion node FD.

The reset transistor TR2 may apply a reset voltage to the gate terminal of the drive transistor TR3. To this end, the reset transistor TR2 may have a drain terminal connected to a driving power source terminal VDD, a source terminal connected to the floating diffusion node FD, and a gate terminal connected to the row scanning circuit 150 (see FIG. 2). When receiving a reset control signal RS from the row scanning circuit 150 (see FIG. 2), the reset transistor TR2 may be turned on to provide an output of the power source terminal VDD to the gate terminal of the drive transistor TR3. When the output of the power source terminal VDD is provided to the gate terminal of the drive transistor TR3, the drive transistor TR3 may be completely turned on. As a result, an output of the drive transistor TR3 may be reset.

The drive transistor TR3 generates a source-drain current in proportion to the amount of photocharges transmitted to the gate terminal thereof. Specifically, the floating diffusion node FD generates a floating diffusion voltage VFD proportional to the amount of photocharges generated by the photodiode PD1. When the floating diffusion voltage VFD is applied to the gate terminal of the drive transistor TR3, the source-drain current proportional to the amount of photocharges may be generated.

For this operation, the drive transistor TR3 may have a drain terminal connected to the power source terminal VDD, a source terminal connected to a drain terminal of the select transistor TR4, and the gate terminal connected to the floating diffusion node FD which is a common terminal of the drain terminal of the transfer transistor TR1 and the source terminal of the reset transistor TR2.

The select transistor TR4 may transfer a current generated by the drive transistor TR3 to the column line C1. To this end, the select transistor TR4 may have the drain terminal connected to the source terminal of the drive transistor TR3, a source terminal connected to the column line C1, and the gate terminal connected to the first row selection line SEL. As described above, the first pixel P1 is connected to the first row selection line SEL but not to the second row selection line SELX. Therefore, the second row selection line SELX may not be connected to the gate terminal of the select transistor TR4.

In the above structure, the select transistor TR may be gated by a signal transmitted to the first row selection line SEL and output a source-drain current (e.g., an image signal) generated by the drive transistor TR3 to the column line C1.

It should be understood that the row scanning circuit 150 is configured to supply the transfer control signal TG and reset signal RS such that the long exposure pixels B and R have a longer exposure time than the short exposure pixels r and b.

Referring to FIG. 3B, a pixel (e.g., the eleventh pixel P11) connected to the second row selection line SELX may include a photodiode PD2, a transfer transistor TR5, a reset transistor TR6, a drive transistor TR7, and a select transistor TR8.

The photodiode PD2, the reset transistor TR6, and the drive transistor TR7 are identical to those described above, and thus a redundant description thereof will be omitted.

Since the eleventh pixel P11 is disposed in the $(i+1)^{th}$ row, a transfer control signal TG(i+1) provided to a gate terminal of the transfer transistor TR5 is different from the transfer control signal TG(i) provided to the gate terminal of the transfer transistor TR1 of the first pixel P1 described above.

In addition, since the eleventh pixel P11 is connected to the second row selection line SELX but not to the first row selection line SEL, the first row selection line SEL may not be connected to a gate terminal of the select transistor TR8.

In the above structure, the select transistor TR8 may be gated by a signal transmitted to the second row selection line SELX and output a source-drain current (e.g., an image signal) generated by the drive transistor TR7 to the column line C4.

Referring back to FIGS. 1 and 2, the column selecting circuit 120 may provide outputs from the plurality of column lines C1-C7 in the pixel array 110 to the sampling circuit 130. The column selecting circuit 120 may connect at least two of the column lines within the pixel array 110 using a column selection signal AVG in order to support the binning mode operation of the image sensor 1.

In some example embodiments, the column selecting circuit 120 may include a column selecting signal generator 122 which generates the column selection signal AVG. However, example embodiments are not limited thereto. The column selection signal AVG may also not be generated by the column selecting circuit 120 but may be provided by, e.g., the row scanning circuit 150.

In FIG. 2, the column selecting circuit 120 includes a first switch S1 which can connect the first column line C1 and the third column line C3, a second switch S2 which can connect the second column line C2 and the fourth column line C4, and a third switch S3 which can connect the fifth column line C5 and the seventh column line C7. The specific operation of the column selecting circuit 120 will be described later.

Referring back to FIG. 1, the reference signal generator 170 may generate a reference signal VRAMP and provide the reference signal VRAMP to the sampling circuit 130. In the current embodiment, the reference signal VRAMP may be in the form of a ramp.

The sampling circuit 130 may receive an output of the column selecting circuit 120 and perform correlation double sampling (CDS) and analog-to-digital conversion once or twice. The sampling circuit 130 may be controlled by the timing control circuit 160 and perform analog-to-digital conversion in each row scan period of the pixel array 110 by the row scanning circuit 150.

Referring to FIG. 4, the sampling circuit 130 may include a plurality of analog-to-digital converters (ADCs), each including a comparator 131, a counter 132, and a latch 133.

The comparator 131 may compare an output of the column line C1 with the reference signal VRAMP and output a value of the comparison result. The counter 132 may perform counting based on the comparison result value of the comparator 131 and provide a value of the counting result to the latch 133. The latch 133 may store the counting result value of the counter 132 and output the counting result value in synchronization with, e.g., a clock signal. In this structure of the sampling circuit 130, an analog signal (e.g., an analog image signal) output from the column line C1 may be converted into a digital signal (e.g., a digital image signal).

Referring back to FIG. 1, the row scanning circuit 150 may control the row addressing and row scanning of the pixel array 110 in response to control signals received from the timing control circuit 160. The row scanning circuit 150 may transmit a signal for activating a corresponding row selection line SEL or SELX to the pixel array 110 in order to select the corresponding row selection line SEL or SELX from the row selection lines SEL and SELX. The row scanning circuit 150 may include a row decoder which selects a row selection line SEL or SELX in the pixel array 110 and a row driver which transmits a signal for activating the selected row selection line SEL or SELX.

The column scanning circuit 140 may control the column addressing and column scanning of the pixel array 110 in response to control signals received from the timing control circuit 160. The column scanning circuit 140 may transmit a digital signal output from the sampling circuit 130 to a digital signal processor (DSP), an image signal processor (ISP), or an external host.

For example, the column scanning circuit 140 may sequentially select the ADCs within the sampling circuit 130 by outputting a horizontal scan control signal to the sampling circuit 130. In some example embodiments, the column scanning circuit 140 may include a column decoder which selects one of the ADCs and a column driver which induces an output of a selected unit ADC to a horizontal transmission line.

The timing control circuit 160 may control the sampling circuit 130, the column scanning circuit 140 and the row scanning circuit 150 and provide control signals (such as a clock signal and a timing control signal) required for the operations of the sampling circuit 130, the column scanning circuit 140 and the row scanning circuit 150. The timing control circuit 160 may include a logic control circuit, a phase lock loop (PLL) circuit, a timing control circuit, a communication interface circuit, etc.

The full mode operation of the image sensor 1 of FIG. 1 will now be described with reference to FIGS. 2 and 5.

Figure 5:
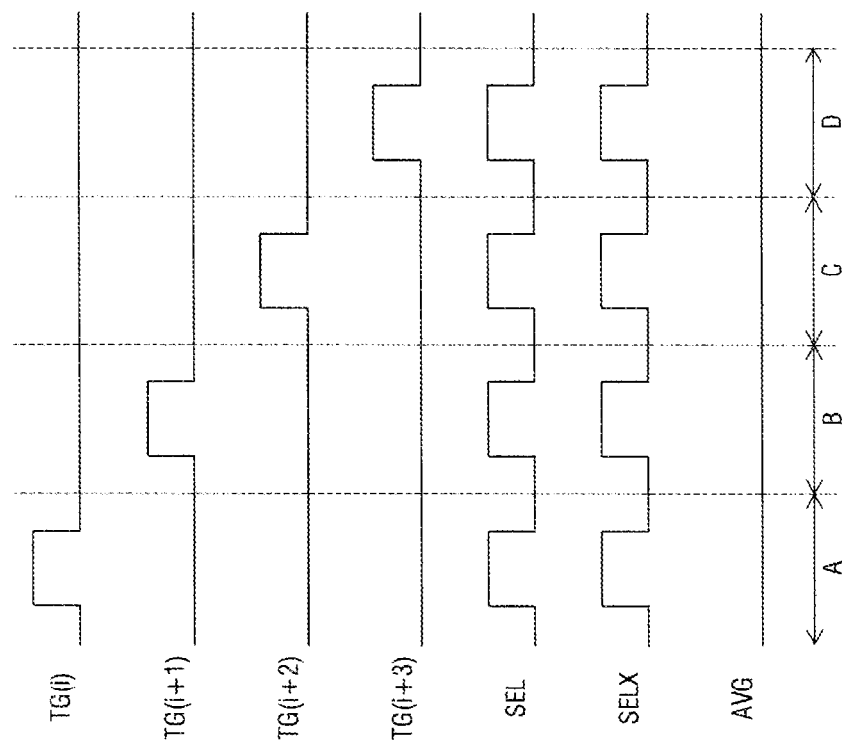
FIG. 5 is a timing diagram illustrating the full mode operation of the image sensor of FIG. 1.

FIG. 5 is a timing diagram illustrating the full mode operation of the image sensor 1 of FIG. 1.

Referring to FIGS. 2 and 5, in section A, the transfer control signal TG(i) for the $i^{th}$ row is provided. In addition, a signal at a high level (hereinafter, the high level denotes a logical high level) is provided to the first and second row selection lines SEL and SELX. Accordingly, image signals output from the pixels P1 through P7 disposed in the $i^{th}$ row are provided to the column selecting circuit 120 via the first through seventh column lines C1 through C7.

In the section A, since the column selection signal AVG is at a low level (hereinafter, the low level denotes a logical low level), all of the first through third switches S1 through S3 included in the column selecting circuit 120 are off. Therefore, outputs of the first through seventh column lines C1 through C7 are provided to the sampling circuit 130 without being combined with each other.

In section B, the transfer control signal TG(i+1) for the $(i+1)^{th}$ row is provided. In addition, a high-level signal is provided to the first and second row selection lines SEL and SELX. Accordingly, image signals output from the pixels P8 through P14 disposed in the $(i+1)^{th}$ row are provided to the column selecting circuit 120 via the first through seventh column lines C1 through C7.

In the section B, since the column selection signal AVG is at a low level, all of the first through third switches S1 through S3 included in the column selecting circuit 120 are off. Therefore, outputs of the first through seventh column lines C1 through C7 are provided to the sampling circuit 130 without being combined with each other.

In sections C and D, an image signal output from each of the pixels P15 through P28 is also provided to the sampling circuit 130 through the same process the process as described above. Therefore, the image sensor 1 can perform the full-mode operation, that is, perform image sensing using all pixels P1 through P28 included in the pixel array 110.

In FIG. 5, a high-level signal is provided in the form of a pulse to the first and second row selection lines SEL and SELX over the sections A through D. However, example embodiments are not limited thereto. That is, in some example embodiments, a high-level signal may be continuously provided to the first and second row selection lines SEL and SELX over the sections A through D.

In addition, in FIG. 5, the transfer control signals TG(i) through TG(i+3) are sequentially transmitted to the $i^{th}$ through $(i+3)^{th}$ rows, respectively. However, example embodiments are not limited thereto. In some other example embodiments n, a high-level signal may be transmitted to the first and second row selection lines SEL and SELX of the $i^{th}$ through $(i+3)^{th}$ rows sequentially.

Specifically, in the section A, a high-level signal may be provided to the first and second row selection lines SEL and SELX disposed in the $i^{th}$ row, and a low-level signal may be provided to the first and second row selection lines SEL and SELX disposed in the $(i+1)^{th}$ through $(i+3)^{th}$ rows. Accordingly, image signals output from the pixels P1 through P7 disposed in the $i^{th}$ row may be provided to the sampling circuit 130 via the first through seventh column lines C1 through C7.

In the section B, a high-level signal may be provided to the first and second row selection lines SEL and SELX disposed in the $(i+1)^{th}$ row, and a low-level signal may be provided to the first and second row selection lines SEL and SELX disposed in the $i^{th}$, $(i+2)^{th}$ and $(i+3)^{th}$ rows. Accordingly, image signals output from the pixels P8 through P14 disposed in the $(i+1)^{th}$ row may be provided to the sampling circuit 130 via the first through seventh column lines C1 through C7.

In the section C, a high-level signal may be provided to the first and second row selection lines SEL and SELX disposed in the $(i+2)^{th}$ row, and a low-level signal may be provided to the first and second row selection lines SEL and SELX disposed in the $i^{th}$, $(i+1)^{th}$, and $(i+3)^{th}$ rows. Accordingly, image signals output from the pixels P15 through P21 disposed in the $(i+2)^{th}$ row may be provided to the sampling circuit 130 via the first through seventh column lines C1 through C7.

Lastly, in the section D, a high-level signal may be provided to the first and second row selection lines SEL and SELX disposed in the $(i+3)^{th}$ row, and a low-level signal may be provided to the first and second row selection lines SEL and SELX disposed in the $i^{th}$ through $(i+2)^{th}$ rows. Accordingly, image signals output from the pixels P22 through P28 disposed in the $(i+3)^{th}$ row may be provided to the sampling circuit 130 via the first through seventh column lines C1 through C7.

In other words, the way each row of the pixel array 110 is selected to output an image signal is not limited to a particular way.

The binning mode operation of the image sensor 1 of FIG. 1 will now be described with reference to FIGS. 2, 6 and 7.

Figure 6:
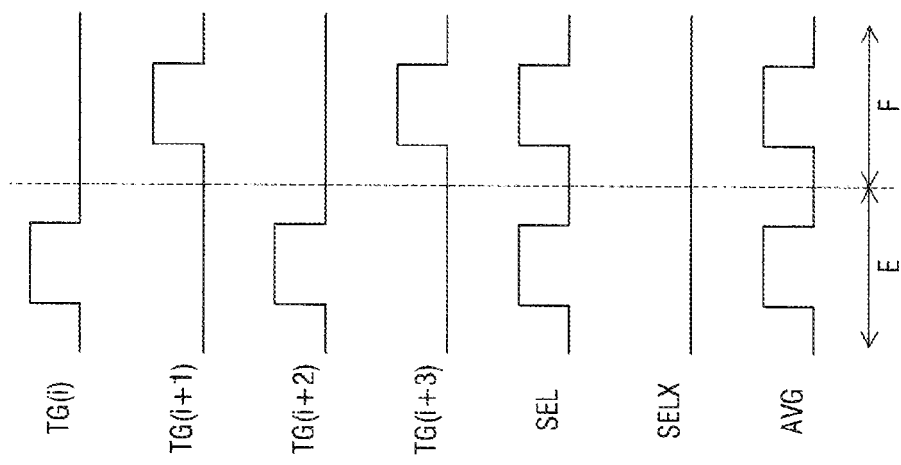
FIG. 6 is a timing diagram illustrating the binning mode operation of the image sensor of FIG. 1.

FIG. 6 is a timing diagram illustrating the binning mode operation of the image sensor 1 of FIG. 1. FIG. 7 is a diagram illustrating pixel arrangement in a case where the image sensor 1 of FIG. 1 performs the binning mode operation.

The binning mode operation of the image sensor 1 will now be descried using a 2×2 binning mode operation as an example. However, example embodiments are not limited to this example. That is, the image sensor 1 can be modified to perform a 3×3 binning mode operation, a 4×4 binning mode operation, etc.

In the 2×2 binning mode operation, nine pixels that form a square are defined as one unit pixel. Therefore, the pixels P1 through P28 illustrated in FIG. 2 may be divided into unit pixels in the 2×2 binning mode operation as shown in Table 1 below.

TABLE 1

| Unit Pixel UPpq (p is a row, and q is a column) | Pixels Included |
|---|---|
| UP11 | P1~P3 |
|  | P8~P10 |
|  | P15~P17 |
| UP12 | P2~P4 |
|  | P9~P11 |
|  | P16~P18 |
| UP13 | P5~P7 |
|  | P12~P14 |
|  | P19~P21 |
| UP21 | P8~P10 |
|  | P15~P17 |
|  | P22~P24 |
| UP22 | P9~P11 |
|  | P16~P18 |
|  | P23~P25 |
| UP23 | P12~P14 |
|  | P19~P21 |
|  | P26~P28 |

Referring to FIGS. 2 and 6, in section E, the transfer control signals TG(i) and TG(i+2) for the $i^{th}$ row and the $(i+2)^{th}$ row are provided. In addition, a high-level signal is provided to the first row selection line SEL, and a low-level signal is provided to the second row selection line SELX.

Accordingly, image signals output from the pixels P1, P2, P4, P6 and P7 connected to the first row selection line SEL among the pixels P1 through P7 disposed in the $i^{th}$ row are provided to the column selecting circuit 120 via the first through seventh column lines C1 through C7. In addition, image signals output from the pixels P16, P17, P18, P19 and P20 connected to the first row selection line SEL among the pixels P15 through P21 disposed in the $(i+2)^{th}$ row are provided to the column selecting circuit 120 via the first through seventh column lines C1 through C7.

In the section E, since the column selection signal AVG is at a high level, all of the first through third switches S1 through S3 included in the column selecting circuit 120 are on. Therefore, an output of the first column line C1 and an output of the third column line C3 are combined and provided accordingly to the sampling circuit 130, an output of the second column line C2 and an output of the fourth column line C4 are combined and provided accordingly to the sampling circuit 130, and an output of the fifth column line C5 and an output of the seventh column line C7 are combined and provided accordingly to the sampling circuit 130.

In section F, the transfer control signals TG(i+1) and TG(i+3) for the $(i+1)^{th}$ row and the $(i+3)^{th}$ row are provided. In addition, a high-level signal is provided to the first row selection line SEL, and a low-level signal is provided to the second row selection line SELX.

Accordingly, image signals output from the pixels P8, P9, P10, P12 and P14 connected to the first row selection line SEL among the pixels P8 through P14 disposed in the $(i+1)^{th}$ row are provided to the column selecting circuit 120 via the first through seventh column lines C1 through C7. In addition, image signals output from the pixels P22, P24, P25, P26, P27 and P28 connected to the first row selection line SEL among the pixels P22 through P28 disposed in the $(i+3)^{th}$ row are provided to the column selecting circuit 120 via the first through seventh column lines C1 through C7.

In the section F, since the column selection signal AVG is at a high level, all of the first through third switches S1 through S3 included in the column selecting circuit 120 are on. Therefore, an output of the first column line C1 and an output of the third column line C3 are combined and provided accordingly to the sampling circuit 130, an output of the second column line C2 and an output of the fourth column line C4 are combined and provided accordingly to the sampling circuit 130, and an output of the fifth column line C5 and an output of the seventh column line C7 are combined and provided accordingly to the sampling circuit 130.

Based on these operations, pixels used in the binning mode operation may be summarized by each unit pixel as shown in Table 2 below.

TABLE 2

| Unit Pixel | Pixels Used |
|---|---|
| UP11(section E) | P1 |
| | P17 |
| UP12(section E) | P2, P4 |
| | P16, P18 |
| UP13(section E) | P7 |
| | P19 |
| UP21(section F) | P8, P10 |
| | P22, P24 |
| UP22(section F) | P9 |
| | P25 |
| UP23(section F) | P12, P14 |
| | P26, P28 |

An output of a unit pixel UP11 is related only to the first pixel P1 and the seventeenth pixel P17 which are long exposure pixels B. That is, the third pixel P3 and the fifteenth pixel P15 which are short exposure pixels b do not affect the output of the unit pixel UP11 because they are not selected. Accordingly, the unit pixel UP11 may be used as a long exposure pixel B in WDR as illustrated in FIG. 7.

An output of a unit pixel UP12 is related to the second pixel P2, the fourth pixel P4, the sixteenth pixel P16 and the eighteenth pixel P18 which are second-type pixels Gb. Accordingly, the unit pixel UP12 may be used as a second-type pixel Gb in WDR as illustrated in FIG. 7.

An output of a unit pixel UP13 is related only to the seventh pixel P7 and the nineteenth pixel P19 which are short exposure pixels b. That is, the fifth pixel P5 and the twenty first pixel P21 which are long exposure pixels B do not affect the output of the unit pixel UP13 because they are not selected. Accordingly, the unit pixel UP13 may be used as a short exposure pixel b in WDR as illustrated in FIG. 7.

An output of a unit pixel UP21 is related to the eighth pixel P8, the tenth pixel P10, the twenty second pixel P22 and the twenty fourth pixel P24 which are first-type pixels Gr. In addition, an output of a unit pixel UP23 is related to the twelfth pixel P12, the fourteenth pixel P14, the twenty sixth pixel P26 and the twenty eighth pixel P28 which are first-type pixels Gr. Accordingly, the unit pixels UP21 and UP23 may be used as first-type pixels Gr in WDR as illustrated in FIG. 7.

Lastly, an output of a unit pixel UP22 is related only to the ninth pixel P9 and the twenty fifth pixel P25 which are long exposure pixels R. That is, the eleventh pixel P11 and the twenty third pixel P23 which are short exposure pixels r do not affect the output of the unit pixel UP22 because they are not selected. Accordingly, the unit pixel UP22 may be used as a long exposure pixel R in WDR as illustrated in FIG. 7.

Unlike in the image sensor 1, if outputs of the unit pixels UP11 through UP13 and UP21 through UP23 are related to both outputs of the long exposure pixels B and R and outputs of the short exposure pixels b and r, reliable WDR cannot be performed in the binning mode operation using the unit pixels UP11 through UP13 and UP21 through UP23.

However, in the image sensor 1, the first and second row selection lines SEL and SELX separated from each other are provided in each row of the pixel array 110. Therefore, WDR can be performed using the unit pixels UP11 through UP13 and UP21 through UP23 even in the binning mode operation. That is, WDR can be performed reliably even in the binning mode operation without the addition of a circuit, which can increase the manufacturing cost of a product, to the image sensor 1.

In FIG. 6, each row of the pixel array 110 is controlled by the transfer control signal TG(i), TG(i+1), TG(i+2) or TG(i+3). However, example embodiments are not limited thereto. As described above, each row of the pixel array 110 may also be controlled by a signal provided to the first and second row selection lines SEL and SELX.

Specifically, in the section E, a high-level signal may be provided to the first row selection line SEL disposed in the $i^{th}$ row and the $(i+2)^{th}$ row, and a low-level signal may be provided to the second selection line SELX disposed in the $i^{th}$ row and the $(i+2)^{th}$ row and to the first and second row selection lines SEL and SELX disposed in the $(i+1)^{th}$ row and the $(i+3)^{th}$ row. Accordingly, the same operation as the operation described above with reference to FIG. 5 may be performed.

In addition, in the section F, a high-level signal may be provided to the first row selection line SEL disposed in the $(i+1)^{th}$ row and the $(i+3)^{th}$ row, and a low-level signal may be provided to the second selection line SELX disposed in the $(i+1)^{th}$ row and the $(i+3)^{th}$ row and to the first and second row selection lines SEL and SELX disposed in the $i^{th}$ row and the $(i+2)^{th}$ row. Accordingly, the same operation as the operation described above with reference to FIG. 5 may be performed.

In other words, the way each row of the pixel array 110 is selected to output an image signal is not limited to a particular way.

An image sensor according to another example embodiment will now be described with reference to FIGS. 8 and 9.

Figure 8:
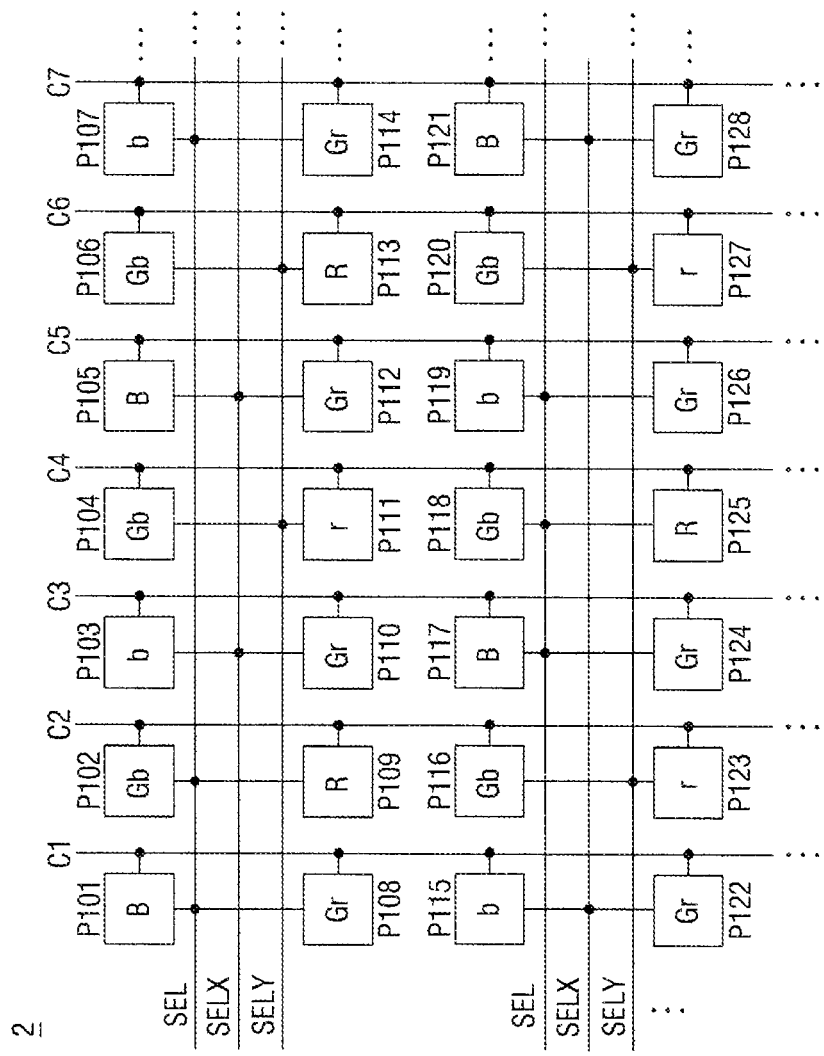
FIG. 8 is a circuit diagram of an image sensor according to another example embodiment.

FIG. 8 is a circuit diagram of an image sensor 2 according to another example embodiment. FIG. 9 is a circuit diagram of pixels included in a pixel array 110 of FIG. 8. For simplicity, a redundant description of elements identical to those in FIGS. 2-7 will be omitted.

Referring to FIG. 8, in the image sensor 2, first, second and third row selection lines SEL, SELX and SELY separated from each other may be provided in each row. In addition, pixels disposed in the same row may be connected to different row selection lines SEL, SELX and SELY.

Specifically, some pixels P101, P102 and P107 of first through seventh pixels P1 through P7 disposed in an $i^{th}$ row may be connected to the first row selection line SEL, some other pixels P103 and P105 may be connected to the second row selection line SELX, and the other pixels P104 and P106 may be connected to the third row selection line SELY.

Eighth through fourteenth pixels P8 through P14 disposed in an $(i+1)^{th}$ row may share the first, second and third row selection lines SEL, SELX and SELY with the first through seventh pixels P101 through P107 disposed in the $i^{th}$ row.

That is, some pixels P108, P109 and P114 of the eighth through fourteenth pixels P108 through P114 disposed in the (i+1) row may share the first row selection line SEL with the pixels P101, P102 and P107 disposed in the $i^{th}$ row, some other pixels P110 and P112 may share the second row selection line SELX with the pixels P103 and P105 disposed in the i row, and the other pixels P11 and P113 may share the third row selection line SELY with the pixels P104 and P106 disposed in the $i^{th}$ row.

Two pixels disposed in the same column share the same row selection line SEL, SELX or SELY because a plurality of pixels P101 through P128 included in the image sensor 2 has a two-shared structure. This will be described in greater detail later.

Some pixels P117, P118 and P119 of fifteenth through twenty first pixels P115 through P121 disposed in an $(i+2)^{th}$ row may be connected to the first row selection line SEL, some other pixels P115 and P121 may be connected to the second row selection line SELX, and the other pixels P116 and P120 may be connected to the third row selection line SELY.

Twenty second through twenty eighth pixels P122 through P128 disposed in an $(i+3)^{th}$ row may share the first, second and third row selection lines SEL, SELX and SELY with the fifteenth through twenty first pixels P115 through P121 disposed in the $(i+2)^{th}$ row.

That is, some pixels P124, P125 and P126 of the twenty second through twenty eighth pixels P122 through P128 disposed in the $(i+3)^{th}$ row may share the first row selection line SEL with the pixels P117, P118 and P119 disposed in the $(i+2)^{th}$ row, some other pixels P122 and P128 may share the second row selection line SELX with the pixels P115 and P121 disposed in the $(i+2)^{th}$ row, and the other pixels P123 and P127 may share the third row selection line SELY with the pixels P116 and P120 disposed in the $(i+2)^{th}$ row.

The pixels P101 through P128 are arranged as described above to enable the image sensor 2 to perform WDR even when operating in the binning mode. This will be described in greater detail later.

As described above, the image sensor 2 may be structured such that two pixels can share one select transistor. This will now be described in greater detail with reference to FIG. 9.

Figure 9:
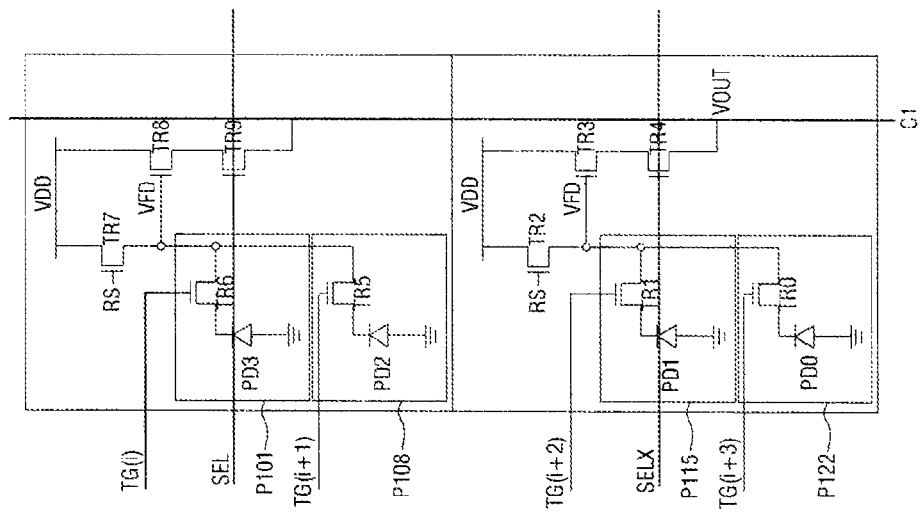
FIG. 9 is a circuit diagram of pixels included in a pixel array of FIG. 8.

Referring to FIG. 9, a photodiode PD0 included in the twenty second pixel P122 and a photodiode PD1 included in the fifteenth pixel P115 may be connected to transfer transistors TR0 and TR1, respectively. Transfer control signals TG(i+3) and TG(i+2) corresponding to rows in which the pixels P122 and P115 are disposed may be provided to gate terminals of the transfer transistors TR0 and TR1, respectively.

A reset control signal RS may be provided to a gate terminal of a reset transistor TR2. As illustrated in the drawing, the two pixels P122 and P115 may share the reset transistor TR2, a drive transistor TR3, and a select transistor TR4. Since the twenty second pixel P122 and the fifteenth pixel P115 are connected to the second row selection line SELX as illustrated in FIG. 8, a gate terminal of the select transistor TR4 may be connected to the second row selection line SELX.

In a substantially similar manner, a photodiode PD2 included in the eighth pixel P108 and a photodiode PD3 included in the first pixel P101 may be connected to transfer transistors TR5 and TR6, respectively. Transfer control signals TG(i+1) and TG(i) corresponding to rows in which the pixels P108 and P101 are disposed may be provided to gate terminals of the transfer transistors TR5 and TR6, respectively.

As illustrated in the drawing, the two pixels P108 and P101 may share a reset transistor TR7, a drive transistor TR8, and a select transistor TR9. Since the eighth pixel P108 and the first pixel P101 are connected to the first row selection line SEL as illustrated in FIG. 8, a gate terminal of the select transistor TR9 may be connected to the first row selection line SELX.

Although not specifically illustrated, two pixels (e.g., P104 and P111) sharing the third row selection line SELX may be structured in a similar way to the above pixels except that a gate terminal of a select transistor (not shown) shared by the two pixels is connected to the third row selection line SELY, and thus a detailed description thereof will be omitted.

The full mode operation of the image sensor 2 of FIG. 8 will now be described with reference to FIGS. 8 and 10.

Figure 10:
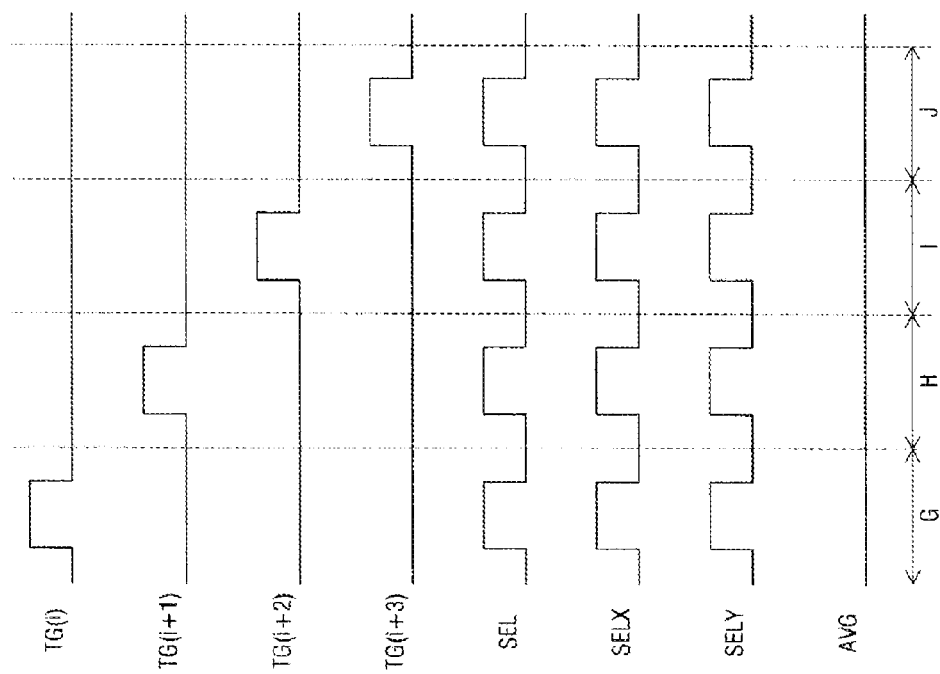
FIG. 10 is a timing diagram illustrating the full mode operation of the image sensor of FIG. 8.

FIG. 10 is a timing diagram illustrating the full mode operation of the image sensor 2 of FIG. 8.

Referring to FIGS. 8 and 10, in section G, the transfer control signal TG(i) for the $i^{th}$ row is provided. In addition, a high-level signal is provided to the first, second and third row selection lines SEL, SELX and SELY. Accordingly, image signals output from the pixels P101 through P107 disposed in the $i^{th}$ row are provided to a column selecting circuit 120 via first through seventh column lines C1 through C7.

In the section G, since a column selection signal AVG is at a low level, all of first through third switches S1 through S3 included in the column selecting circuit 120 are off. Therefore, outputs of the first through seventh column lines C1 through C7 are provided to a sampling circuit 130 without being combined with each other.

In section H, the transfer control signal TG(i+1) for the $(i+1)^{th}$ row is provided. In addition, a high-level signal is provided to the first, second and third row selection lines SEL, SELX and SELY. Accordingly, image signals output from the pixels P108 through P114 disposed in the $(i+1)^{th}$ row are provided to the column selecting circuit 120 via the first through seventh column lines C1 through C7.

In the section H, since the column selection signal AVG is at a low level, all of the first through third switches S1 through S3 included in the column selecting circuit 120 are off. Therefore, outputs of the first through seventh column lines C1 through C7 are provided to the sampling circuit 130 without being combined with each other.

In sections I and J, an image signal output from each of the pixels P115 through P128 is also provided to the sampling circuit 130 through the same process the process as described above. Therefore, the image sensor 2 can perform the full-mode operation, that is, perform image sensing using all pixels P101 through P128 included in the pixel array 110.

In FIG. 10, a high-level signal is provided in the form of a pulse to the first, second and third row selection lines SEL, SELX and SELY over the sections G through J. However, example embodiments are not limited thereto. That is, in some example embodiments, a high-level signal may be continuously provided to the first, second and third row selection lines SEL, SELX and SELY over the sections G through J.

In addition, in FIG. 10, the transfer control signals TG(i) through TG(i+3) are sequentially transmitted to the $i^{th}$ through $(i+3)^{th}$ rows, respectively. However, example embodiments are not limited thereto. In some other example embodiments, a high-level signal may be transmitted to the first, second and third row selection lines SEL, SELX and SELY of the $i^{th}$ through $(i+3)^{th}$ rows sequentially. Since this is similar to the description of FIG. 5, a redundant description thereof will be omitted.

The binning mode operation of the image sensor 2 of FIG. 8 will now be described with reference to FIGS. 8 and 11.

Figure 11:
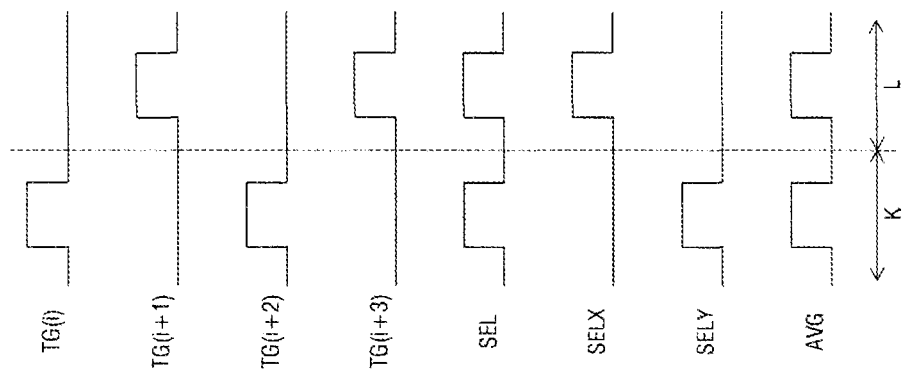
FIG. 11 is a timing diagram illustrating the binning mode operation of the image sensor of FIG. 8.

FIG. 11 is a timing diagram illustrating the binning mode operation of the image sensor 2 of FIG. 8.

The binning mode operation of the image sensor 2 will now be descried using a 2×2 binning mode operation as an example, but example embodiments are not limited to this example.

Referring to FIGS. 8 and 11, in section K, the transfer control signals TG(i) and TG(i+2) for the $i^{th}$ row and the $(i+2)^{th}$ row are provided. In addition, a high-level signal is provided to the first row selection line SEL and the third row selection line SELY, and a low-level signal is provided to the second row selection line SELX.

Accordingly, image signals output from the pixels P101, P102 and P107 connected to the first row selection line SEL and image signals output from the pixels P104 and P106 connected to the third row selection line SELY among the pixels P101 through P107 disposed in the $i^{th}$ row are provided to the column selecting circuit 120 via the first through seventh column lines C1 through C7. In addition, image signals output from the pixels P117, P118 and P119 connected to the first row selection line SEL and image signals output from the pixels P116 and P120 connected to the third row selection line SELY among the pixels P115 through P121 disposed in the $(i+2)^{th}$ row are provided to the column selecting circuit 120 via the first through seventh column lines C1 through C7.

In the section K, since the column selection signal AVG is at a high level, all of the first through third switches S1 through S3 included in the column selecting circuit 120 are on. Therefore, an output of the first column line C1 and an output of the third column line C3 are combined and provided accordingly to the sampling circuit 130, an output of the second column line C2 and an output of the fourth column line C4 are combined and provided accordingly to the sampling circuit 130, and an output of the fifth column line C5 and an output of the seventh column line C7 are combined and provided accordingly to the sampling circuit 130.

In section L, the transfer control signals TG(i+1) and TG(i+3) for the $(i+1)^{th}$ row and the $(i+3)^{th}$ row are provided. In addition, a high-level signal is provided to the first row selection line SEL and the second row selection line SELX, and a low-level signal is provided to the third row selection line SELY.

Accordingly, image signals output from the pixels P108, P109 and P114 connected to the first row selection line SEL and image signals output from the pixels P110 and P112 connected to the second row selection line SELX among the pixels P108 through P114 disposed in the $(i+1)^{th}$ row are provided to the column selecting circuit 120 via the first through seventh column lines C1 through C7. In addition, image signals output from the pixels P124, P125, P126 and P127 connected to the first row selection line SEL and image signals output from the pixels P122 and P128 connected to the second row selection line SELX among the pixels P122 through P128 disposed in the $(i+4)^{th}$ row are provided to the column selecting circuit 120 via the first through seventh column lines C1 through C7.

In the section L, since the column selection signal AVG is at a high level, all of the first through third switches S1 through S3 included in the column selecting circuit 120 are on. Therefore, an output of the first column line C1 and an output of the third column line C3 are combined and provided accordingly to the sampling circuit 130, an output of the second column line C2 and an output of the fourth column line C4 are combined and provided accordingly to the sampling circuit 130, and an output of the fifth column line C5 and an output of the seventh column line C7 are combined and provided accordingly to the sampling circuit 130.

As described above, in the image sensor 2, the first, second and third row selection lines SEL, SELX and SELY separated from one another are provided in each row of the pixel array 110. Each pair of upper and lower pixels (e.g., P101 and P108), all of which are used in the binning mode operation, are connected to the first row selection line SEL. Each pair of a lower pixel (e.g., P110) which is used in the binning mode operation and an upper pixel (e.g., P103) which is not used in the binning mode operation are connected to the second row selection line SELX. Each pair of an upper pixel (e.g., P104) which is used in the binning mode operation and a lower pixel (e.g., P111) which is not used in the binning mode operation are connected to the third row selection line SELY.

Accordingly, as described above, in the image sensor 2, pixels used to form each unit pixel in the binning mode operation are the same as those in the image sensor 1 described above. Therefore, the image sensor 2 can also perform WDR reliably in the binning mode operation.

In FIG. 11, each row of the pixel array 110 is controlled by the transfer control signal TG(i), TG(i+1), TG(i+2) or TG(i+3). However, example embodiments are not limited thereto. As described above, each row of the pixel array 110 may also be controlled by a signal provided to the first, second and third row selection lines SEL, SELX and SELY. Since this has been fully described above, a redundant description thereof will be omitted.

An image sensor according to another example embodiment will now be described with reference to FIGS. 12 through 17.

Figure 12:
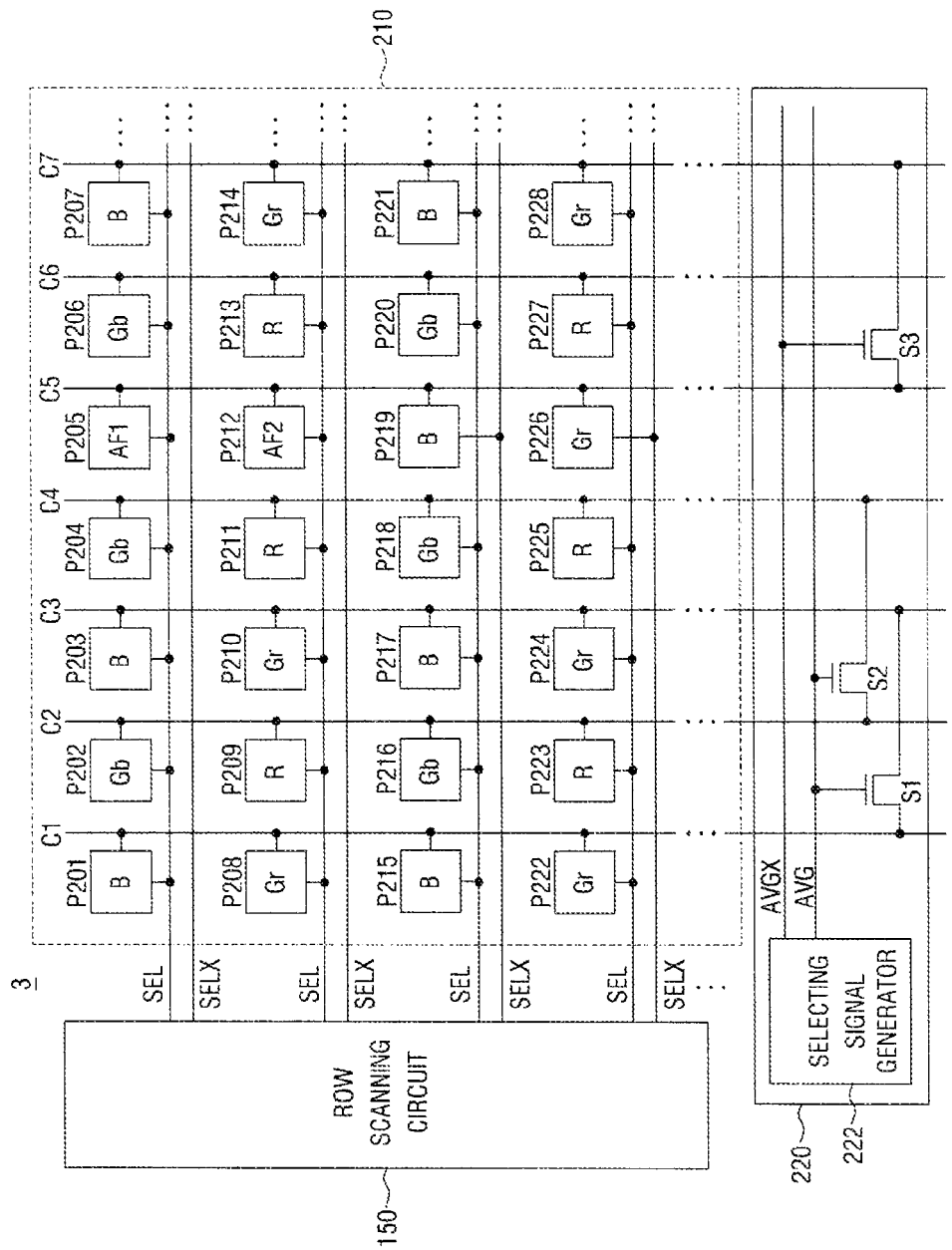
FIG. 12 is a circuit diagram of an image sensor according to another example embodiment.
Figure 13:
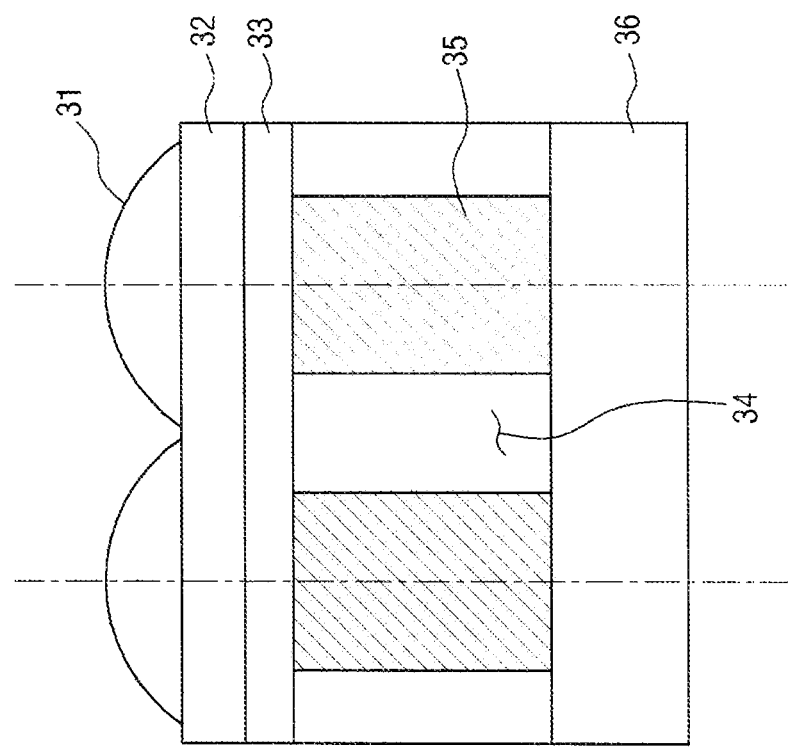
FIG. 13 is a diagram illustrating the structure of sensing pixels included in a pixel array of FIG. 12.
Figure 14:
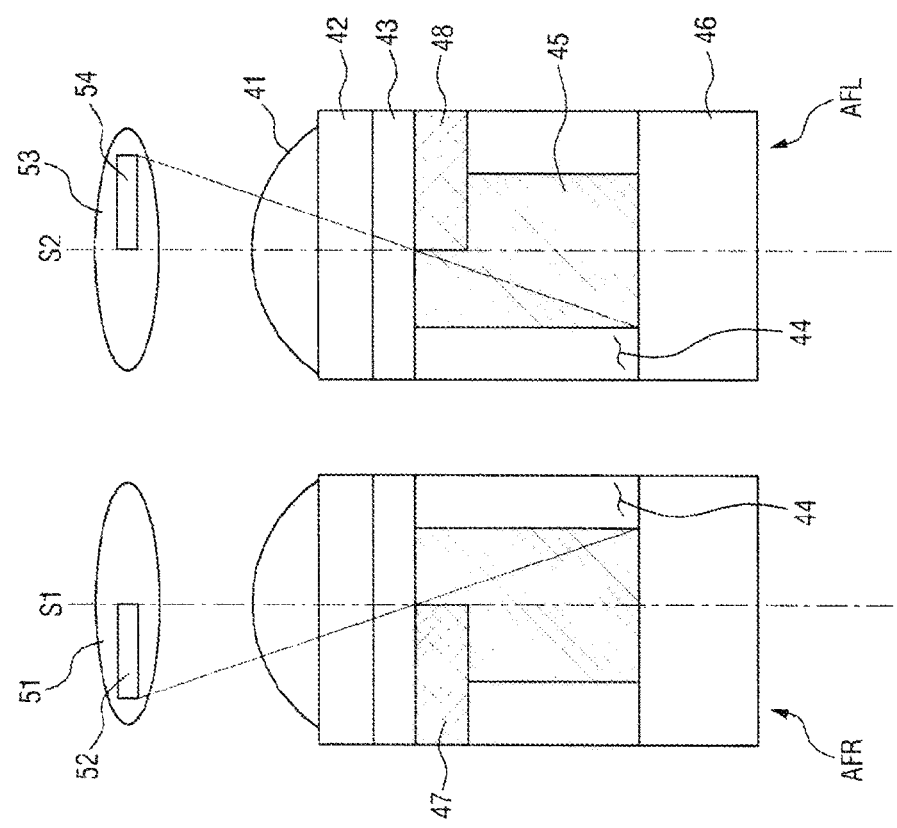
FIG. 14 is a diagram illustrating the structure of phase-difference detection pixels included in the pixel array of FIG. 12.
Figure 15:
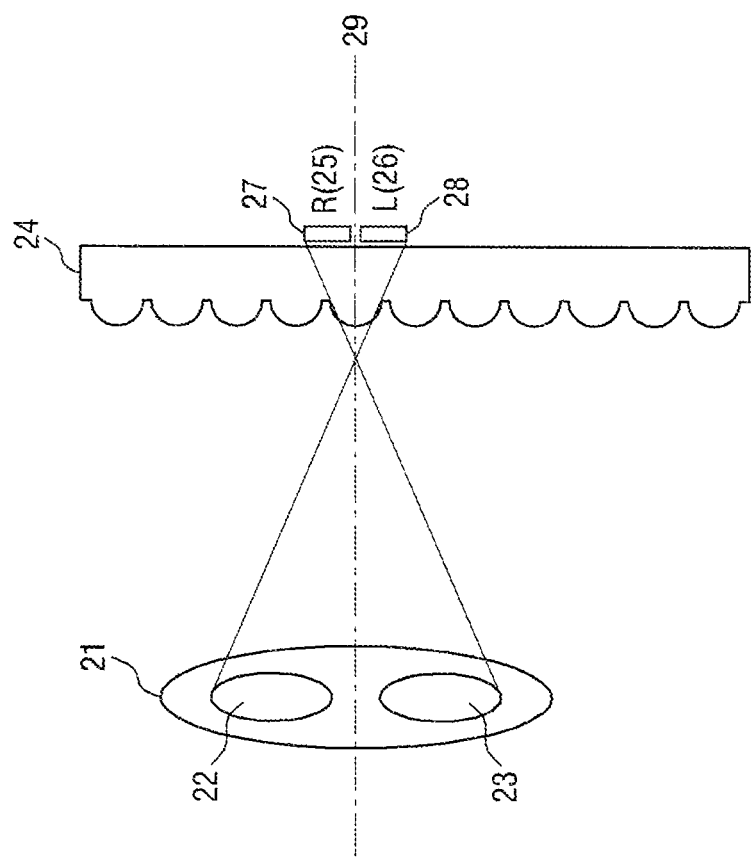
FIGS. 15 through 17 are diagrams illustrating a process of performing auto-focusing the phase-difference detection pixels of FIG. 14.
Figure 16:
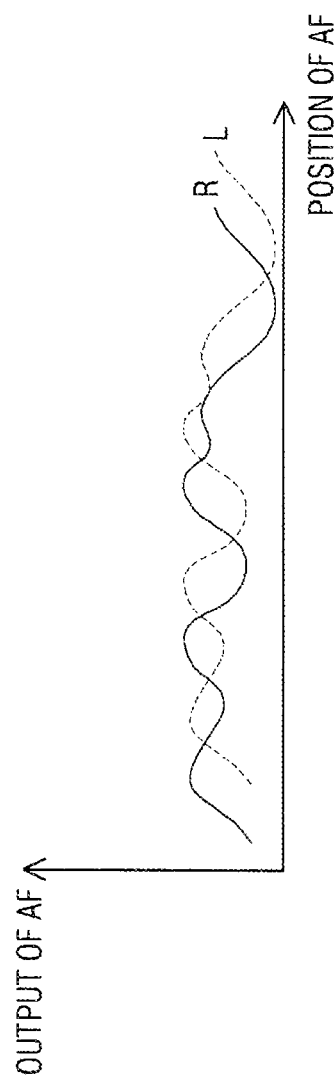
Figure 17:
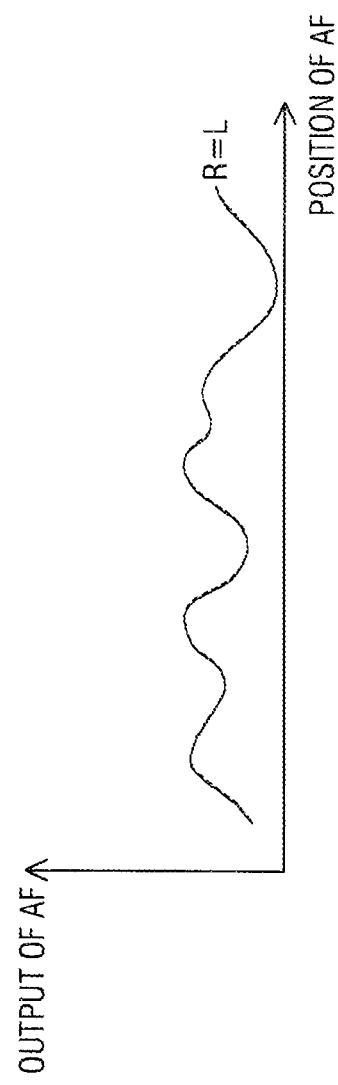

FIG. 12 is a circuit diagram of an image sensor 3 according to another example embodiment. FIG. 13 is a diagram illustrating a structure of sensing pixels included in a pixel array 210 of FIG. 12. FIG. 14 is a diagram illustrating the structure of phase-difference detection pixels included in the pixel array 210 of FIG. 12. FIGS. 15 through 17 are diagrams illustrating a process of performing auto-focusing the phase-difference detection pixels of FIG. 14. For simplicity, a redundant description of elements identical to those of FIGS. 2-11 will be omitted.

Referring to FIG. 12, the pixel array 210 of the image sensor 3 may include sensing pixels P201 through P204, P206 through P211, and P213 through P228 and phase-difference detection pixels P205 and P212.

Referring to FIG. 13, each of adjacent sensing pixels (e.g., P201 and P202) may include a microlens 31, a surface layer 32, a color filter layer 33, a wiring layer 34, a photodiode layer 35, and a substrate layer 36. In FIG. 13, cross-sections of the adjacent sensing pixels (e.g., P201 and P202) are schematically illustrated, but example embodiments are not limited to the illustration of FIG. 13.

Light from a subject is induced to the photodiode layers 35 of the adjacent sensing pixels (e.g., P201 and P202) by the microlenses 31. In response to the light, photodiodes included in the photodiode layers 35 may generate electric charges, thereby producing pixel information. The electric charges generated by the photodiode layers 35 may be output through the wiring layer 34. The light from the subject may be incident as the whole light that passed through an exit pupil of a photographing lens, and luminance information corresponding to the position of the subject may be obtained from a corresponding pixel position. Three colors (red, green and blue) may be used in each pixel as the color filter layer 33. However, cyan (C), magenta (M) and yellow (Y) may also be used if necessary.

Referring to FIG. 14, each of the phase-difference detection pixels P205 and P212 may include a microlens 41, a surface layer 42, a color filter layer 43, a wiring layer 44, a photodiode layer 45, a substrate layer 46, and a mask 47 or 48. That is, the phase-difference detection pixels P205 and P212 may further include the masks 47 and 48 compared with the sensing pixels described above with reference to FIG. 13.

The phase-difference detection pixels P205 and P212 may include a first-type pixel AFR and a second-type pixel AFL. The first-type pixel AFR may be a right pixel for detecting a phase difference, and the second-type pixel AFL may be a left pixel. The right mask 47 may be disposed between the microlens 41 and the photodiode 45, and the left mask 48 may be disposed between the microlens 41 and the photodiode 45 of the second-type pixel AFL.

The positions of the masks 47 and 48 are not limited to the positions illustrated in FIG. 14 and can be changed as long as the masks 47 and 48 are disposed between the microlens 41 and the photodiode 45. In some example embodiments, the mask 47 of the first-type pixel AFR may be placed on the left side of the photodiode 45, and the mask 48 of the second-type pixel AFL may be placed on the right side of the photodiode 45. However, example embodiments are not limited thereto.

In FIG. 14, optical axes S1 and S2 of the microlenses 41 are indicated by alternated long and short dash lines, and the paths of light incident from the microlenses 41 are indicated by dotted lines. The masks 47 and 48 of FIG. 14 may respectively limit light incident upon the photodiodes 45 from pupils 52 and 54 to 50% of the photodiodes 45 with respect to the optical axes S1 and S2 of the microlenses 41.

When the position of a pixel does not match the optical axis S1 or S2 of the photographing lens 51 or 53, the position of the mask 47 or 48 may be changed.

The image sensor 3 may perform auto focusing the phase-difference detection pixels P205 and P212 as will be described in greater detail below with reference to FIGS. 15 through 17.

Referring to FIG. 15, light from a subject may pass through a photographing lens 21 and then enter a right light-receiving pixel 25 and a left light-receiving pixel 26 via a microlens column 24. Masks 27 and 28 that limit light incident from pupils 22 and 23 of the photographing lens 21 may be placed in a portion of the right light-receiving pixel 25 and a portion of the left light-receiving pixel 26. In addition, light from the pupil 22 located above an optical axis 29 of the photographing lens 21 among the pupils 22 and 23 of the photographing lens 21 may enter the left light-receiving pixel 26, and light from the pupil 23 located under the optical axis 29 of the photographing lens 21 may enter the right light-receiving pixel 25. The right light-receiving pixel 25 and the left light-receiving pixel 26 may be the phase-difference detection pixels P205 and P212 described above.

The image sensor 3 may perform auto focusing based on output values generated by light incident on the right light-receiving pixel 25 and the left light-receiving pixel 26. Specifically, referring to FIG. 16, when there is a phase difference between an output value of the right light-receiving pixel 25 and an output value of the left light-receiving pixel 26 according to the position of the right light-receiving pixel 25 and the position of the left light-receiving pixel 26, the image sensor 3 may perform auto focusing. Referring to FIG. 17, when there is no phase difference between an output value of the right light-receiving pixel 25 and an output value of the left light-receiving pixel 26 according to the position of the right light-receiving pixel 25 and the position of the left light-receiving pixel 26, the image sensor 3 may stop auto focusing.

In the image sensor 3, the sensing pixels P219 and P226 which share a column line C5 with the phase-difference detection pixels P205 and P212 are connected to a second row selection line SELX.

Specifically, referring to FIG. 12, the phase-difference detection pixels P205 and P212 and the sensing pixels P201 through P204, P206 through P211, P213 through P218, P220 through P225, P227 and P228 which do not share the column line C5 with the phase-difference detection pixels P205 and P212 may be connected to a first row selection line SEL, and the sensing pixels P219 and P226 which share the column line C5 with the phase-difference detection pixels P205 and P212 may be connected to the second row selection line SELX.

A column selecting circuit 220 may include a column selecting signal generator 222 which generates a first column selection signal AVG and a second column selection signal AVGX. The first column selection signal AVG may be used to combine outputs of the sensing pixels P201 through P204, P206 through P211, P213 through P218, P220 through P225, P227 and P228 in the binning mode operation as described above. However, the second column selection signal AVGX may be used to generate a unit pixel related only to outputs of the phase-difference detection pixels P205 and P212 in the binning mode operation.

In FIG. 12, the column selecting signal generator 222 is included within the column selecting circuit 220, but example embodiments are not limited thereto. The first column selection signal AVG and the second column selection signal AVGX may not be generated by the column selecting circuit 220 but may be provided by, e.g., a row scanning circuit 150.

The operation of the image sensor 3 will now be described in greater detail with reference to FIGS. 18 and 19.

First, the full mode operation of the image sensor 3 will be described with reference to FIGS. 12 and 18.

Figure 18:
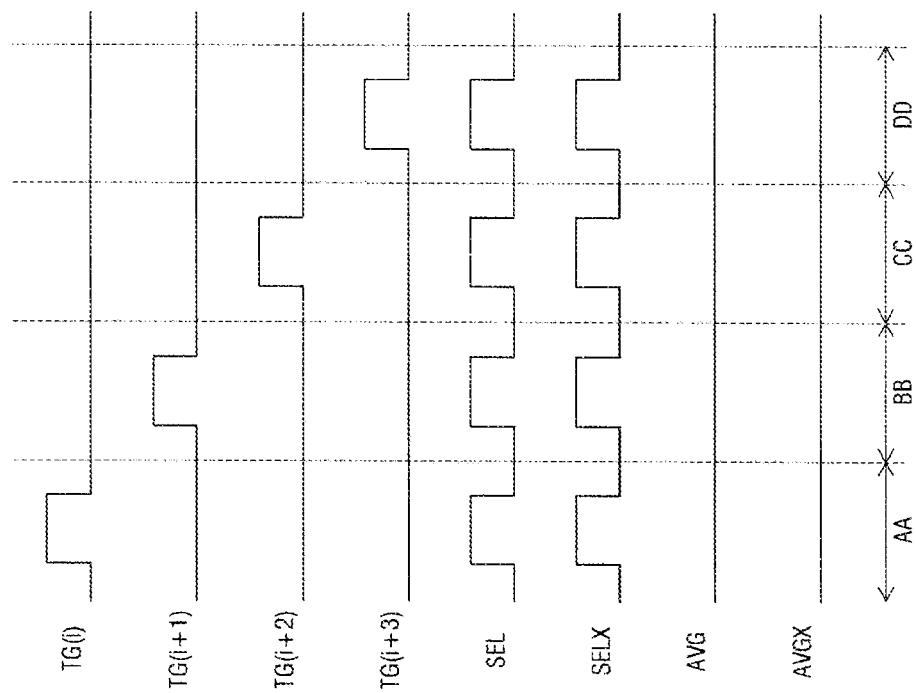
FIG. 18 is a timing diagram illustrating the full mode operation of the image sensor of FIG. 12.

FIG. 18 is a timing diagram illustrating the full mode operation of the image sensor 3 of FIG. 12.

Referring to FIGS. 12 and 18, in section AA, a transfer control signal TG(i) for an $i^{th}$ row is provided. In addition, a high-level signal is provided to the first and second row selection lines SEL and SELX. Accordingly, image signals output from the sensing pixels P201 through P204, P206 and P207 disposed in the $i^{th}$ row and a phase-difference detection signal output from the phase-difference detection pixel P205 are output along first through seventh column lines C1 through C7.

In the section AA, since the first column selection signal AVG and the second column selection signal AVGX are at a low level, all of first through third switches S1 through S3 included in the column selecting circuit 220 are off. Therefore, outputs of the first through seventh column lines C1 through C7 are provided to the sampling circuit 130 without being combined with each other.

In section BB, the same operation as the operation performed in the section AA is performed, and thus a detailed description thereof will be omitted.

In section CC, a transfer control signal TG(i+2) for an (i+2)$^{th}$ row is provided. In addition, a high-level signal is provided to the first and second row selection lines SEL and SELX. Accordingly, image signals output from the sensing pixels P215 through P221 disposed in the (i+2)$^{th}$ row are output along the first through seventh column lines C1 through C7.

In the section CC, since the first column selection signal AVG and the second column selection signal AVGX are at a low level, all of the first through third switches S1 through S3 included in the column selecting circuit 220 are off. Therefore, outputs of the first through seventh column lines C1 through C7 are provided to the sampling circuit 130 without being combined with each other.

In section DD, the same operation as the operation performed in the section CC is performed, and thus a detailed description thereof will be omitted.

As described above, the image sensor 3 can perform the full-mode operation, that is, perform image sensing using outputs of all sensing pixels P201 through P204, P206 through P211 and P213 through P228 and the phase-difference detection pixels P205 and P212 included in the pixel array 210.

The binning mode operation of the image sensor 3 will now be described with reference to FIGS. 12, 19 and 20.

Figure 19:
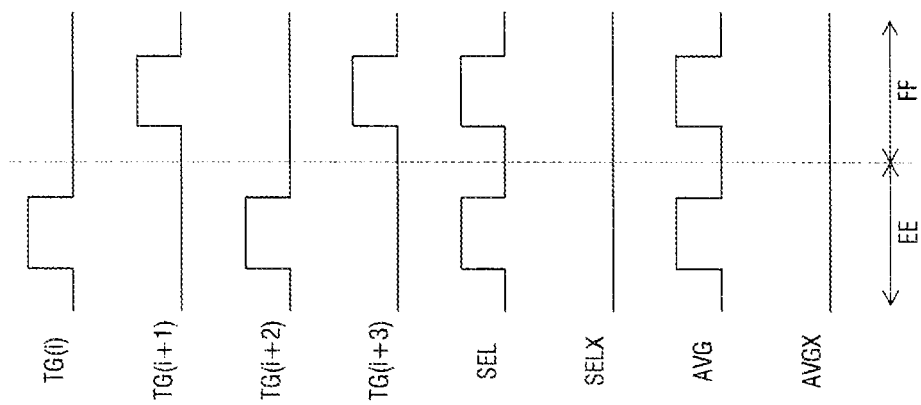
FIG. 19 is a timing diagram illustrating the binning mode operation of the image sensor of FIG. 12.

FIG. 19 is a timing diagram illustrating the binning mode operation of the image sensor 3 of FIG. 12. FIG. 20 is a diagram illustrating pixel arrangement in a case where the image sensor 3 of FIG. 12 performs the binning mode operation.

The binning mode operation of the image sensor 3 will now be descried using a 2×2 binning mode operation as an example, but example embodiments are not limited to this example.

The pixels P201 through P228 illustrated in FIG. 12 may be divided into unit pixels in the 2×2 binning mode operation as shown in Table 3 below.

TABLE 3

| Unit Pixel UPpq (p is a row, and q is a column) | Pixels Included |
|---|---|
| UP11 | P201~P203 |
|  | P208~P210 |
|  | P215~P217 |
| UP12 | P202~P204 |
|  | P209~P211 |
|  | P216~P218 |
| UP13 | P205~P207 |
|  | P212~P214 |
|  | P219~P221 |
| UP21 | P208~P210 |
|  | P215~P217 |
|  | P222~P224 |
| UP22 | P209~P211 |
|  | P216~P218 |
|  | P223~P225 |
| UP23 | P212~P214 |
|  | P219~P221 |
|  | P226~P228 |

Referring to FIGS. 12 and 19, in section EE, the transfer control signals TG(i) and TG(i+2) for the i$^{th}$ row and the (i+2) row are provided. In addition, a high-level signal is provided to the first row selection line SEL, and a low-level signal is provided to the second row selection line SELX.

In the section EE, since the first column selection signal AVG is at a high level and the second column selection signal AVGX is at a low level, the first and second switches S1 and S2 included in the column selecting circuit 220 are on, but the third switch S3 is off.

Therefore, only an output of the phase-difference detection pixel P205 is considered as an output of a unit pixel UP13. Specifically, since a low-level signal is provided to the second row selection line SELX, an output of the sensing pixel 219 is not provided to the column line C5. In addition, since the second column selection signal AVGX is at a low level, the third switch S3 is turned off. Therefore, outputs of the sensing pixels 207 and 221 connected to the seventh column line C7 are not combined. That is, only an output of the phase-difference detection pixel P205 is considered as an output of the unit pixel UP13, as illustrated in FIG. 20.

Outputs of the sensing pixels P201 through P204 and P215 through P218 are combined, and the combined outputs are considered as outputs of other unit pixels UP11 and UP12. Since this has been fully described above, a detailed description thereof will be omitted.

In section FF, transfer control signals TG(i+1) and TG(i+3) for an (i+1)$^{th}$ row and an (i+3)$^{th}$ row are provided. In addition, a high-level signal is provided to the first row selection line SEL, and a low-level signal is provided to the second row selection line SELX.

In the section FF, since the first column selection signal AVG is at a high level and the second column selection signal AVGX is at a low level, the first and second switches S1 and S2 included in the column selecting circuit 220 are on, but the third switch S3 is off.

Therefore, only an output of the phase-difference detection pixel P212 is considered as an output of a unit pixel UP23. Specifically, since a low-level signal is provided to the second row selection line SELX, an output of the sensing pixel 226 is not provided to the column line C5. In addition, since the second column selection signal AVGX is at a low level, the third switch S3 is turned off. Therefore, outputs of the sensing pixels 214 and 228 connected to the seventh column line C7 are not combined. That is, only an output of the phase-difference detection pixel P212 is considered as an output of the unit pixel UP23, as illustrated in FIG. 20.

Outputs of the sensing pixels P208 through P211 and P222 through P225 are also combined, and the combined outputs are considered as outputs of other unit pixels UP21 and UP22. Since this has been fully described above, a detailed description thereof will be omitted.

Based on these operations, pixels used in the binning mode operation may be summarized by each unit pixel as shown in Table 4 below.

TABLE 4

| Unit Pixel | Pixels Used |
|---|---|
| UP11(section EE) | P201, P203 |
|  | P215, P217 |
| UP12(section EE) | P202, P204 |
|  | P216, P218 |
| UP13(section EE) | P205 |
| UP21(section FF) | P208, P210 |
|  | P222, P224 |
| UP22(section FF) | P209, P211 |
|  | P223, P225 |
| UP23(section FF) | P212 |

In the image sensor 3, the first and second row selection lines SEL and SELX separated from each other are provided in each row of the pixel array 210, and the first through third switches S through S3 included in the column selecting circuit 220 are turned on or off using the first and second column selection signals AVG and AVGX. Therefore, the image sensor 3 can perform auto focusing even in the binning mode operation using the unit pixels UP1 through UP13 and UP21 through UP23. That is, auto focusing can be performed reliably even in the binning mode operation without the addition of a circuit, which can increase the manufacturing cost of a product, to the image sensor 3.

In FIG. 19, each row of the pixel array 210 is controlled by the transfer control signal TG(i), TG(i+1), TG(i+2) or TG(i+3). However, example embodiments are not limited thereto. As described above, each row of the pixel array 210 may also be controlled by a signal provided to the first and second row selection lines SEL and SELX. Since this has been fully described above, a detailed description thereof will be omitted.

An image sensor according to another example embodiment will now be described with reference to FIG. 21.

Figure 21:
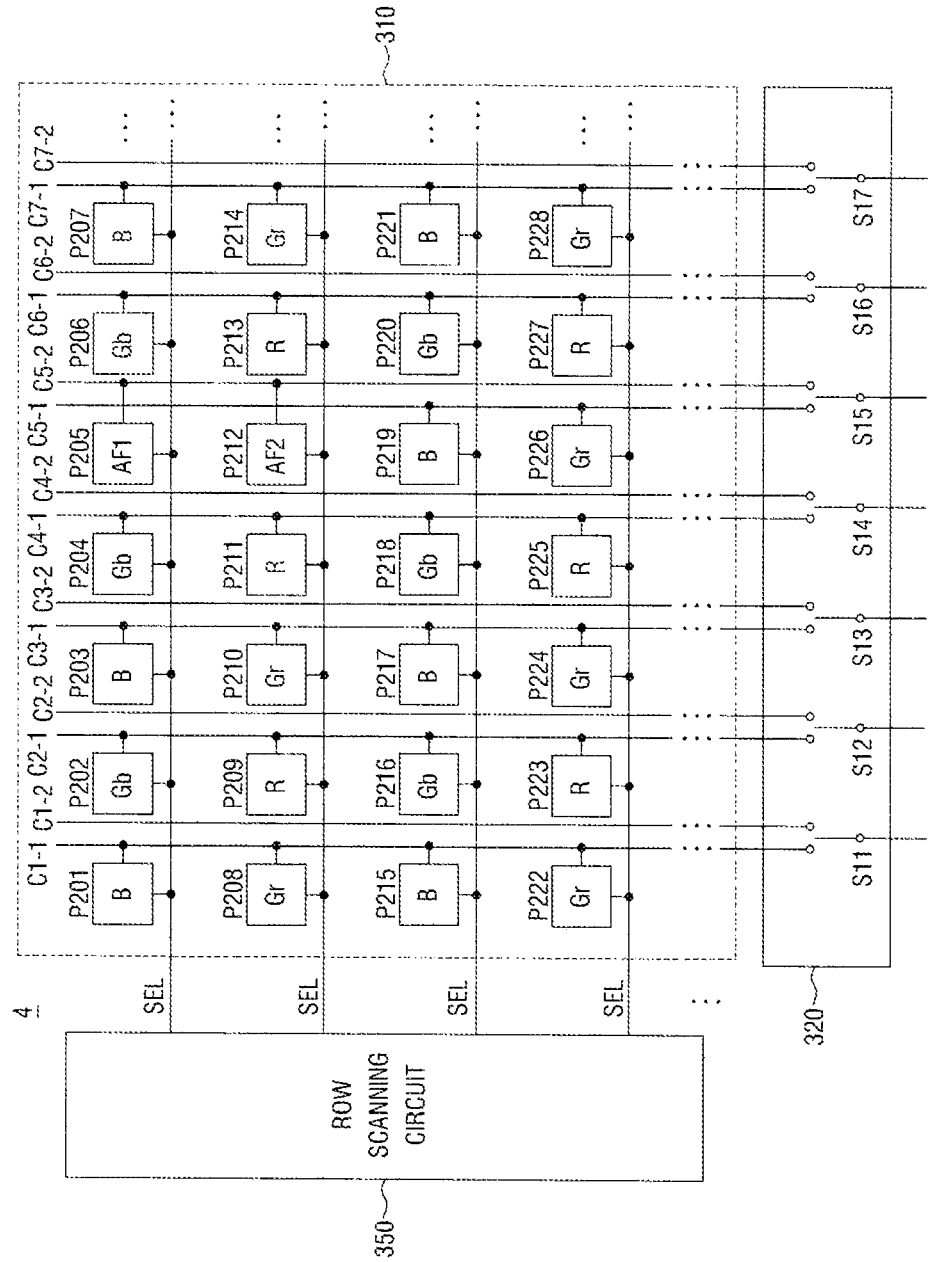
FIG. 21 is a circuit diagram of an image sensor according to another example embodiment.

FIG. 21 is a circuit diagram of an image sensor 4 according to another example embodiment. FIG. 21 will be described, focusing mainly on differences with FIGS. 2-20.

Referring to FIG. 21, in the image sensor 4, one row selection line SEL is provided in each row. In other words, each row of a pixel array 310 is connected to a row scanning circuit 350 by one row selection line SEL.

In the image sensor 4, first and second column selection lines C1-1 through C7-2 separated from each other are provided in each column. In addition, sensing pixels P201 through P204, P206 through P211 and P213 through P228 and phase-difference detection pixels P205 and P212 are connected to different column selection lines as illustrated in the drawing.

Specifically, all of the sensing pixels P201, P208, P215 and P222 disposed in a first column may be connected to the first column selection line C1-1, all of the sensing pixels P202, P209, P216 and P223 disposed in a second column may be connected to the first column selection line C2-1, all of the sensing pixels P203, P210, P217 and P224 disposed in a third column may be connected to the first column selection line C3-1, all of the sensing pixels P204, P211, P218 and P225 disposed in a fourth column may be connected to the first column selection line C4-1, all of the sensing pixels P219 and P226 disposed in a fifth column may be connected to the first column selection line C5-1, all of the sensing pixels P206, P213, P220 and P227 disposed in a sixth column may be connected to the first column selection line C6-1, and all of the sensing pixels P207, P214, P221 and P228 disposed in a seventh column may be connected to the first column selection line C7-1.

All of the phase-difference detection pixels P205 and P212 disposed in the fifth column may be connected to the second column selection line C5-2.

A column selecting circuit 320 may include a plurality of switches S11 through S17 which can select the first and second column selection lines C1-1 through C7-2. A selecting signal generator (e.g. 122) may generate signals to control the switches 511 through 517.

The image sensor 4 structured as described above can perform auto focusing even in a binning mode operation. Specifically, in the binning mode operation, the eleventh through fourteenth switches S11 through S14 and the sixteenth switch S16 may be connected to the first column selection lines C1-1 through C4-1 and C6-1, and the fifteenth switch S15 and the seventeenth switch S17 may be connected to the second column selection lines C5-2 and C7-2. In this case, unit pixel outputs can be obtained as illustrated in FIG. 20. That is, by connecting the fifteenth switch S15 and the seventeenth switch S17 to the second column selection lines C5-2 and C7-2, outputs of the phase-difference detection pixels P205 and P212 only may be considered as outputs of the unit pixels UP13 and UP23.

Therefore, the image sensor 4 can perform auto focusing in the binning mode operation.

Figure 22:
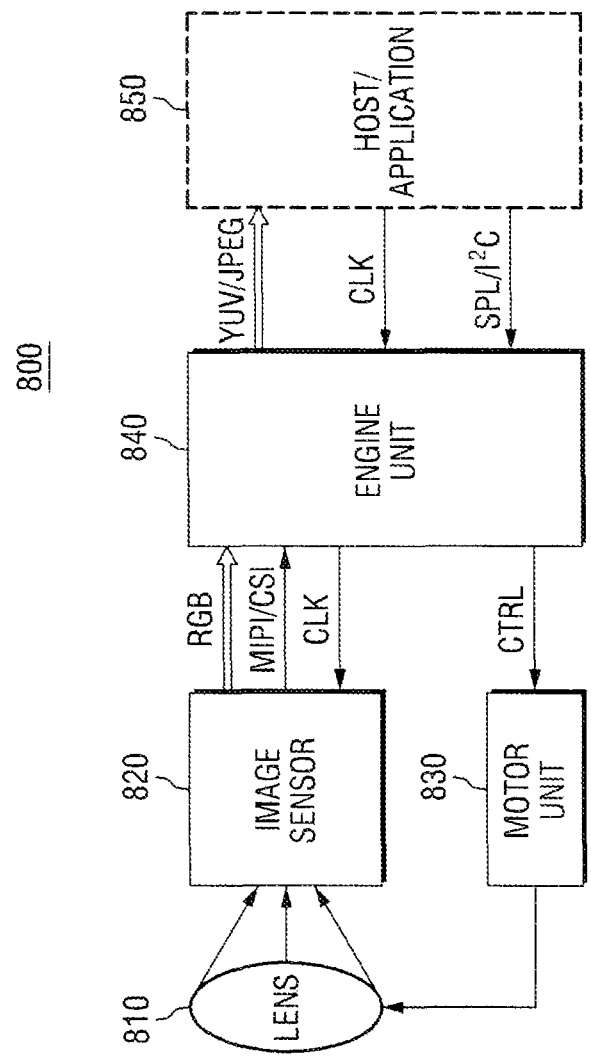
FIG. 22 is a block diagram of an example of a digital camera using an image sensor.

FIG. 22 is a block diagram of an example of a digital camera 800 using an image sensor according to example embodiments.

Referring to FIG. 22, the digital camera 800 may include a lens 810, an image sensor 820, a motor unit 830, and an engine unit 840. The image sensor 820 may be any one of the image sensors according to the above-described example embodiments in FIGS. 1-21.

The lens 810 focuses incident light onto a light-receiving region of the image sensor 820. The image sensor 820 may generate RGB data RGB in a Bayer pattern based on the light received through the lens 810. The image sensor 820 may provide the RGB data RGB based on a clock signal CLK.

In some example embodiments, the image sensor 820 may interface with the engine unit 840 using a mobile industry processor interface (MIPI) and/or a camera serial interface (CSI).

The motor unit 830 may adjust the focus of the lens 810 or perform shuttering in response to a control signal CTRL received from the engine unit 840. The engine unit 840 may control the image sensor 820 and the motor unit 830. In addition, the engine unit 840 may generate YUV data YUV including a luminance component, a difference between the luminance component and a blue component and a difference between the luminance component and a red component or generate compressed data, e.g., Joint Photography Experts Group (JPEG) data based on the RGB data RGB received from the image sensor 820.

The engine unit 840 may be connected to a host/application 850 and may provide the YUV data YUV or the JPEG data to the host/application 850 based on a master clock MCLK. In addition, the engine unit 840 may interface with the host/application 850 using a serial peripheral interface (SPI) and/or an inter-integrated circuit (I$^2$C).

Figure 23:
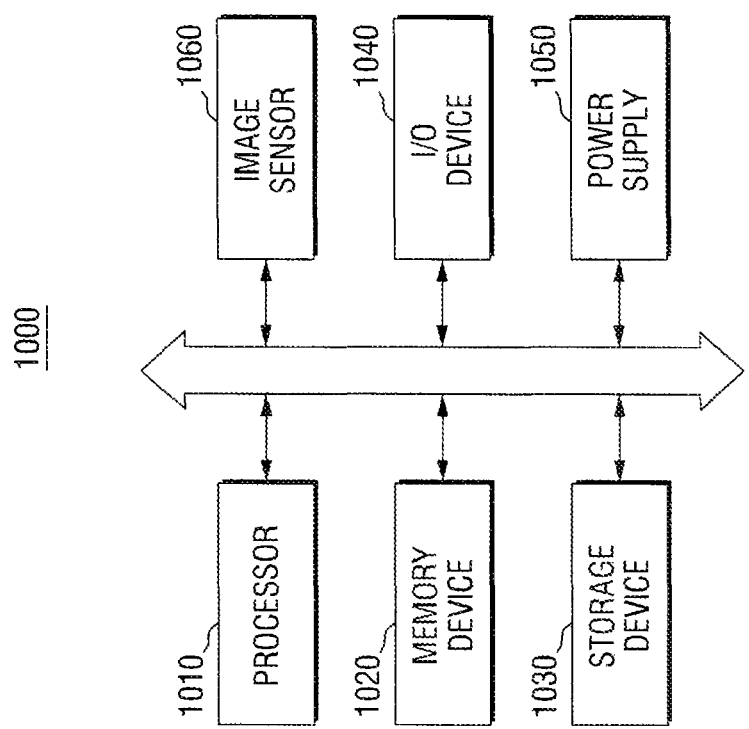
FIG. 23 is a block diagram of an example of a computing system using an image sensor.

FIG. 23 is a block diagram of an example of a computing system 1000 using an image sensor according to example embodiments.

Referring to FIG. 23, the computing system 1000 may include a processor 1010, a memory device 1020, a storage device 1030, an input/output (I/O) device 1040, a power supply 1050, and an image sensor 1060.

The image sensor 1060 may be any one of the image sensors according to the above-described example embodiments in FIGS. 1-21. Although illustrated in FIG. 23, the computing system 1000 may further include ports that can communicate with a video card, a sound card, a memory card, a USB device, or other electronic devices.

The processor 1010 may perform various calculations or tasks. According to example embodiments, the processor 1010 may be a microprocessor or a central processing unit (CPU).

The processor 1010 may communicate with the memory device 1020, the storage device 1030 and the I/O device 1040 through an address bus, a control bus, and a data bus.

According to example embodiments, the processor 1010 may be coupled to an extended bus, such as a peripheral component interconnection (PCI) bus.

The memory device 1020 may store data required for the operation of the computing system 1000.

For example, the memory device 1020 may be implemented as a dynamic random access memory (DRAM), a mobile DRAM, a static random access memory (SRAM), a phase random access memory (PRAM), a ferroelectric random access memory (FRAM), a resistive random access memory (RRAM), and/or a magnetic random access memory (MRAM). The storage device 1030 may include a solid state drive (SSD), a hard disk drive (HDD), a CD-ROM, etc.

The I/O device 1040 may include an input device (e.g., a keyboard, a keypad, a mouse, etc.) and an output device (e.g., a printer, a display, etc.). The power supply 1050 may supply an operating voltage required for the operation of the computing system 1000.

The image sensor 1060 may be connected to and communicate with the processor 1010 via buses or other communication links. The image sensor 1060 and the processor 1010 may be integrated together onto a single chip or may be integrated separately onto different chips, respectively.

The computing system 1000 may be any type of computing system using an image sensor. For example, the computing system 1000 may be a digital camera, a mobile phone, a personal digital assistant (PDA), a portable multimedia player (PMP), a smart phone, a table PC, etc.

In some example embodiments, the computing system 1000 may be an Ultra Mobile PC (UMPC), a work station, a net-book, a portable computer, a wireless phone, a mobile phone, an e-book, a portable game console, a navigation device, a black box, a 3-dimensional television, a digital audio recorder, a digital audio player, a digital picture recorder, a digital picture player, a digital video recorder, a digital video player, etc.

Figure 24:
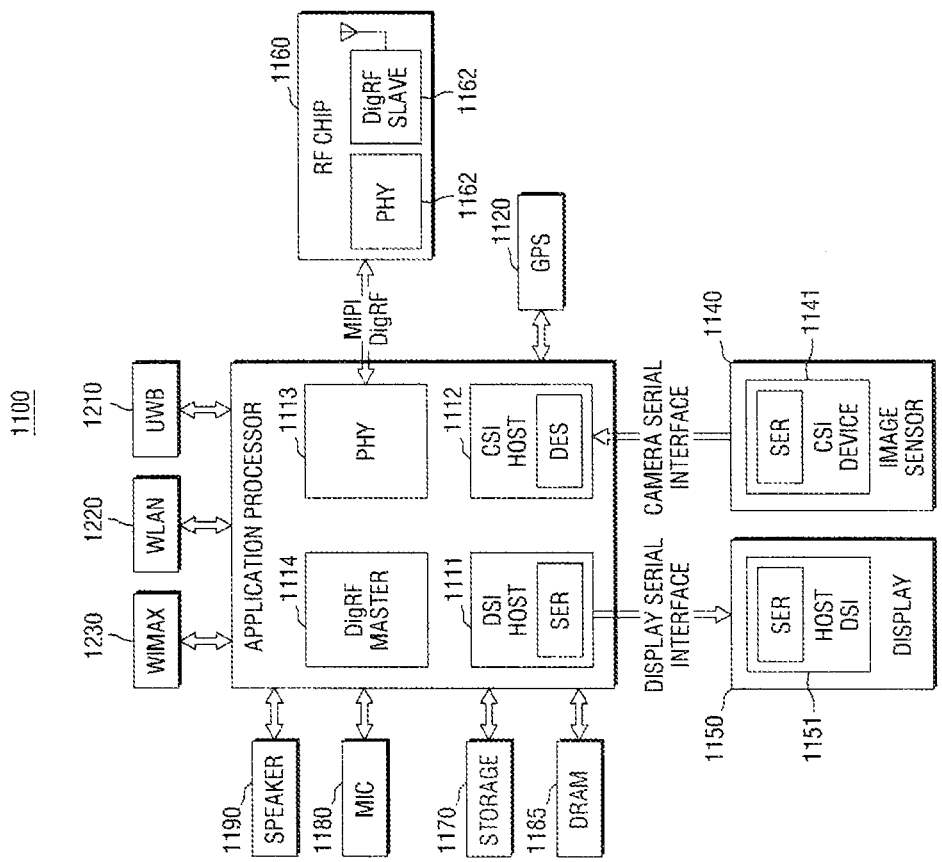
FIG. 24 is a block diagram illustrating an example of interfaces used in the computing system of FIG. 23.

FIG. 24 is a block diagram illustrating an example of interfaces used in the computing system of FIG. 23.

Referring to FIG. 24, a computing system 1100 may be implemented as a data processing device that uses or supports a mobile industry processor interface (MIPI). The computing system 1100 may include an application processor 1110, an image sensor 1140 and a display 1150.

A camera serial interface (CSI) host 1112 of the application processor 1110 may perform serial communication with a CSI device 1141 of the image sensor 1140 via a CSI. In some example embodiments, the CSI host 1112 may include a deserializer (DES), and the CSI device 1141 may include a serializer (SER). A display serial interface (DSI) host 1111 of the application processor 1110 may perform serial communication with a DSI device 1151 of the display 1150 via a DSI.

In some example embodiments, the DSI host 1111 may include an SER, and the DSI device 1151 may include a DES. The computing system 1100 may further include a radio frequency (RF) chip 1160 which can communicate with the application processor 1110. A physical layer (PHY) 1113 of the computing system 1100 and a PHY 1161 of the RF chip 1160 may perform data communications based on a MIPI DigRF.

The application processor 1110 may further include a DigRF MASTER 1114 which controls the data communication of the PHY 1161 based on the MIPI DigRF. The computing system 1100 may further include a global positioning system (GPS) 1120, a storage 1170, a microphone 1180, a DRAM 1185, and a speaker 1190. In addition, the computing system 1100 may perform communications using an ultra wideband (UWB) 1120, a wireless local area network (WLAN) 1220, a worldwide interoperability for microwave access (WIMAX) 1230, etc. However, the above structure and interfaces of the computing system 1100 are merely an example, and example embodiments are not limited to this example.

In concluding the detailed description, those skilled in the art will appreciate that many variations and modifications can be made to example embodiments without substantially departing from the principles of example embodiments. Therefore, the disclosed example embodiments are used in a generic and descriptive sense only and not for purposes of limitation.

What is claimed is:

1. An image sensor comprising:
   a pixel array including,
   a plurality of pixels including at least a first pixel and a second pixel,
   first and second row selection lines separated from each other, and
   first and second column lines separated from each other; and
   a column selecting circuit configured to connect the first column line to the second column line using a column selection signal,
   the first pixel being connected to the first row selection line and the first column line, and
   the second pixel being in the same row as the first pixel and connected to the second row selection line and the second column line.

2. The image sensor of claim 1, wherein the column selecting circuit is configured to output a signal to a sampling circuit, the sampling circuit including an analog-to-digital converter (ADC).

3. The image sensor of claim 1, wherein
   the first pixel includes,
      a first drive transistor configured to receive an output of a first photodiode and generate a source-drain current based on the output of the first photodiode, and
      a first select transistor connected to the first row selection line and configured to provide an output of the first drive transistor to the first column line, and
   the second pixel includes,
      a second drive transistor configured to receive an output of a second photodiode and generate a source-drain current based on the output of the second photodiode, and
      a second select transistor connected to the second row selection line and configured to provide an output of the second drive transistor to the second column line.

4. The image sensor of claim 1, wherein the plurality of pixels are in a Bayer pattern.

5. The image sensor of claim 4, further comprising:
   a control circuit configured to supply at least one control signal to the first pixel and the second pixel such that the first pixel has a longer exposure time than an exposure time of the second pixel.

6. The image sensor of claim 5, wherein the plurality of pixels are in a chess mosaic pattern.

7. The image sensor of claim 4, wherein the pixel array further comprises:
   a third pixel connected to the first column line and the second row selection line, wherein the first and second pixels include sensing pixels, and the third pixel includes a phase-difference detection pixel.

8. The image sensor of claim 7, wherein
   the pixel array further includes third and fourth column lines separated from the first and second column lines,
   the column selection signal includes first and second column selection signal parts, and the column selecting circuit is configured to connect the first and second column lines using the first column selection signal part and connect the third and fourth column lines using the second column selection signal part.

9. The image sensor of claim 1, further comprising:
a third row selection line separated from the first and second row selection lines;
a third column line separated from the first and second column lines; and
the plurality of pixels includes a third pixel, the third pixel being in the same row of the pixel array as the first pixel and connected to the third row selection line and the third column line.

10. The image sensor of claim 9, wherein each of the first, second and third pixels comprises a first subpixel and a second subpixel, and the first subpixel and the second subpixel share a select transistor.

11. A pixel array including,
a plurality of pixels,
first and second row selection lines separated from each other, and column lines intersecting the first and second row selection lines, the column lines including first and second column lines which are separated from each other;
a row scanning circuit configured to control the first and second row selection lines;
a column selecting circuit configured to connect the first column line to the second column line using a column selection signal and to connect the connected first and second column lines to a sampling circuit; and
the sampling circuit configured to receive outputs of the column lines and convert the received outputs into digital signals,
the first and second row selection lines being in each row of the pixel array, and at least one select transistor in a number of the plurality of pixels is connected to one of the first and second row selection lines.

12. The image sensor of claim 11, wherein
the column lines further includes third and fourth column lines which are separated from the first and second column lines,
the column selection signal includes a first column selection signal part and a second column selection signal part, and
the column selecting circuit is configured to connect the first and second column lines based on the first column selection signal part and to connect the third and fourth column lines based on the second column selection signal part.

13. The image sensor of claim 12, wherein pixels connected to the first through third column lines are all connected to the first row selection line, and pixels connected to the fourth column line include a first pixel connected to the first row selection line and a second pixel connected to the second row selection line.

14. The image sensor of claim 13, wherein the first pixel includes a phase-difference detection pixel, and the second pixel includes a sensing pixel.

15. An image sensor comprising:
a pixel array having rows and columns of pixels, the rows connected to first and second selection lines and the pixel array having first exposure pixels and second exposure pixels;
a control circuit configured to supply at least one control signal to the pixels such that an exposure time of the first exposure pixels is greater than an exposure time of the second exposure pixels; and
a column selecting circuit configured to connect a first number of columns of pixels to a second number of columns of pixels based on an operating mode of the image sensor.

16. The image sensor of claim 15, further comprising:
a row scanning circuit configured to output selection signals to the first and second selection lines, respectively, the column selecting circuit configured to combine outputs of only the first exposure pixels based on the selection signals and to combine outputs of only the second exposure pixels based on the selection signals.

17. The image sensor of claim 15, wherein the operating mode is one of a binning mode and a non-binning mode.

18. The image sensor of claim 15, wherein two pixels in a same column are connected to a same selection line.

19. The image sensor of claim 15, wherein the pixel array further includes a third selection line, and a first pixel in a first row and a second pixel in the second row are connected to the third selection line.

* * * * *